US011755973B2

(12) United States Patent
Krishna et al.

(10) Patent No.: US 11,755,973 B2
(45) Date of Patent: Sep. 12, 2023

(54) SYSTEM AND METHOD FOR INTELLIGENT CONTRACT GUIDANCE

(71) Applicant: Accenture Global Solutions Limited, Dublin (IE)

(72) Inventors: Rajlakshmi Krishna, Cochin (IN); Bhushan Gurmukhdas Jagyasi, Thane West (IN); Meera Geetha, Bangalore (IN); Krishnamurthy Ramamurthy, Bangalore (IN); Sundar Prasad Jayaraman, Chennai (IN); Harsha Jawagal, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 182 days.

(21) Appl. No.: 17/175,243

(22) Filed: Feb. 12, 2021

(65) Prior Publication Data

US 2022/0261711 A1 Aug. 18, 2022

(51) Int. Cl.
| | |
|---|---|
| *G06Q 10/0635* | (2023.01) |
| *G06Q 50/18* | (2012.01) |
| *G06Q 10/0637* | (2023.01) |
| *G06F 16/35* | (2019.01) |
| *G06N 5/022* | (2023.01) |
| *G06F 16/332* | (2019.01) |

(52) U.S. Cl.
CPC ..... *G06Q 10/0635* (2013.01); *G06F 16/3329* (2019.01); *G06F 16/353* (2019.01); *G06N 5/022* (2013.01); *G06Q 10/06375* (2013.01); *G06Q 50/188* (2013.01)

(58) Field of Classification Search
CPC ........ G06Q 10/0635; G06Q 10/06375; G06Q 50/188; G06F 16/3329; G06F 16/353; G06N 5/022
See application file for complete search history.

(56) References Cited

U.S. PATENT DOCUMENTS

| | | | |
|---|---|---|---|
| 8,180,713 B1 * | 5/2012 | Rigby ................... | G06Q 40/08 706/12 |
| 9,754,206 B1 * | 9/2017 | Brestoff ............ | G06Q 10/0635 |
| 11,416,956 B2 * | 8/2022 | Wodetzki ............... | G06N 5/046 |
| 2011/0078074 A1 * | 3/2011 | Lipman .................. | G06Q 20/10 705/347 |

(Continued)

OTHER PUBLICATIONS

"United States Patent for Using Classified Text and Deep Learning Algorithms to Identify Drafting Risks in a Document and Provide Early Warning Issued to Intraspexion Inc"; Global IP News. Software Patent News [New Delhi] Sep. 5, 2017. (Year: 2017).*

(Continued)

*Primary Examiner* — Dylan C White
(74) *Attorney, Agent, or Firm* — Plumsea Law Group, LLC

(57) ABSTRACT

A system and method of determining whether specific clauses in a contract have a likelihood of falling under a particular risk category is disclosed. The proposed systems and methods describe an autonomous digital assistant that accepts contract-related queries from end-users and generates conversational responses. For example, an end-user may request information about the contract's terms, and the system can automatically provide intelligent analytical responses that bypass the need to manually evaluate the various features of the document.

20 Claims, 18 Drawing Sheets

(56) References Cited

U.S. PATENT DOCUMENTS

| | | | | |
|---|---|---|---|---|
| 2012/0109965 | A1* | 5/2012 | Nagendran | G06F 16/951 |
| | | | | 707/740 |
| 2013/0297519 | A1* | 11/2013 | Brestoff | G06F 40/247 |
| | | | | 705/311 |
| 2014/0244524 | A1* | 8/2014 | Brestoff | G06Q 10/06 |
| | | | | 705/311 |
| 2014/0337086 | A1* | 11/2014 | Asenjo | H04L 41/0896 |
| | | | | 705/7.28 |
| 2016/0132798 | A1* | 5/2016 | Picard | G06Q 50/18 |
| | | | | 705/7.28 |
| 2017/0011313 | A1* | 1/2017 | Pochert | G06F 3/0481 |
| 2018/0341860 | A1* | 11/2018 | Shazeer | G06N 3/08 |
| 2019/0138804 | A1* | 5/2019 | Suzuki | G06K 9/00442 |
| 2019/0332620 | A1* | 10/2019 | Wason | G06N 5/022 |
| 2020/0104681 | A1* | 4/2020 | Li | G06N 3/08 |
| 2020/0104729 | A1* | 4/2020 | Busbridge | G06N 3/082 |
| 2020/0226510 | A1* | 7/2020 | Gupta | G06Q 50/18 |
| 2020/0293729 | A1* | 9/2020 | Arslan | G06N 3/0445 |
| 2020/0311353 | A1* | 10/2020 | Li | G06F 40/30 |
| 2022/0398680 | A1* | 12/2022 | Wodetzki | G06Q 10/10 |
| 2023/0186213 | A1* | 6/2023 | Tr | G06Q 10/0635 |
| | | | | 705/7.28 |

OTHER PUBLICATIONS

Owusu, Abena Fosua.; "Three Essays on the Application of Machine Learning for Risk Governance in Financial Institutions"; ProQuest Dissertations and Theses; ProQuest Dissertations Publishing. (Aug. 2020) (Year: 2020).*

* cited by examiner

SYSTEM AND METHOD FOR INTELLIGENT CONTRACT GUIDANCE

TECHNICAL FIELD

The present disclosure generally relates to automatically providing intelligent information and insights regarding contract documents. More specifically, the present disclosure relates to a system and method for intelligent, automatic contract evaluations and assessments in order to effectively and efficiently identify potentially weak and strong clauses in a contract document.

BACKGROUND

Companies, organizations, and other entities frequently enter into service agreements or contracts with their customers and suppliers. In some cases, either party may require the agreement to provide a long-term contractual service agreement that may last for an extended number of years. It can be appreciated that a detailed cost/risk evaluation should be conducted before execution of the agreement occurs. Determining a risk level or risk type that may be associated with a contract clause can be a difficult task, particularly in light of how many contracts include hundreds of pages of writing. In addition, while one person's experience may help them recognize that a clause represents a particular type of risk, another person may fail to perceive the same issue. In addition, ambiguity and gaps in the contract can be extremely challenging—finding what is 'missing' in a large document, particularly when that missing feature can be one of many different features, is time-consuming and highly susceptible to human errors, leading to execution of weak contracts. In addition, the contract format and structure will vary with each stakeholder, increasing the complexity of such assessments.

There is a need in the art for a system and method that addresses the shortcomings discussed above.

SUMMARY

A system and method of determining risk categories and calculating risk levels for clauses in contracts is disclosed. The system and method solve the problems discussed above by providing a comprehensive, autonomous contract risk analysis and assessment platform. The system applies artificial intelligence models that can autonomously generate insights, recommendations, summaries, and alerts for key contract clauses and milestones to users via a virtual assistant-based chatbot interface. The system provides highly accurate risk levels for various types of contract clauses, as well as identification of potentially problematic clause types, thereby minimizing the likelihood of a contract failing to serve the needs of a signing party.

In one aspect, the disclosure provides a method of determining a risk category for a contract clause. The method includes a first step of detecting one or more clauses of a first contract document, and a second step of feeding one clause into a specificity model configured to identify a risk category for a contract clause based on clause classifications provided by a contract knowledge engine. In addition, the method includes a third step of automatically determining the one clause falls under a first risk category and classifying it as such, and a fourth step of causing a computing device to present a message identifying the first risk category for the one clause.

In another aspect, the disclosure provides a method of calculating risk levels for clauses in a contract. The method includes a first step of receiving, via a chatbot interface, a first request for an evaluation of a first contract, and a second step of identifying a plurality of clauses in the first contract. A third step includes feeding the plurality of clauses into a specificity model configured to calculate a risk level for each contract clause based on clause classifications provided by a contract knowledge engine. In addition, the method includes a fourth step of automatically assigning each of the plurality of clauses a risk level, and a fifth step of causing a computing device to present, via the chatbot interface, a first message identifying the risk levels for each of the plurality of clauses.

In another aspect, the disclosure provides a system for determining a risk category for a contract clause. The system includes a processor and machine-readable media including instructions which, when executed by the processor, cause the processor to detect one or more clauses of a first contract document, and to feed one clause of the one or more clauses into a specificity model configured to identify a risk category for a contract clause based on clause classifications provided by a contract knowledge engine. The instructions further cause the processor to automatically determine the one clause falls under a first risk category and classifying it as such, and to cause a computing device to present a message identifying the first risk category for the one clause.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
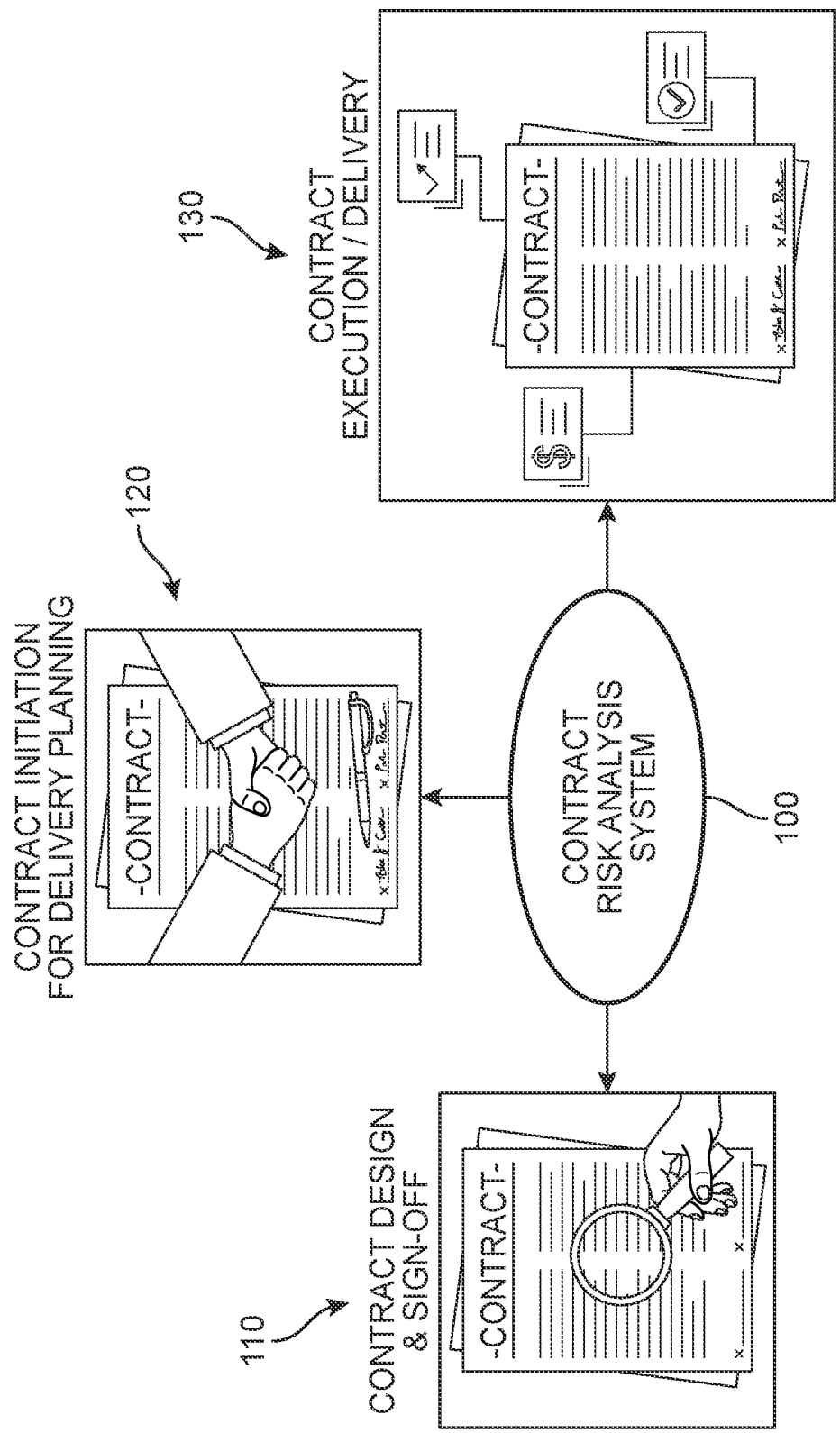
FIG. 1 is a schematic diagram of the performance stages of an embodiment of a contract risk analysis system.

The ability to create and administer comprehensive, complex contracts has become a critical skillset for those tasked with managing multi-level consumer and supplier relations. A contract establishes the responsibilities, timeframes, payment, and pricing for the goods or services being provided. Such agreements are used as a means by which to measure the performance of the supplier and other contractual parties. Provisions that are common or typical to such agreements include a definition of the services to be provided; compensation for the work; invoicing and payment terms; qualifications or other requirements of the personnel that will be assigned to the consulting tasks; ownership of the project's work products; standard of care; insurance requirements; dispute processes; indemnification or "hold harmless" clauses; warranties; and provisions for the suspension or termination of consulting services, as well as other clauses. The performance of each party will be assessed based on their adherence to the terms of the agreement. It can be appreciated therefore that contract reviews are a critical aspect of managing the expectations of the parties to the contract. Unfortunately, contracts frequently include ambiguous terms regarding critical aspects.

The proposed systems and methods describe an autonomous virtual assistant service and platform that can significantly reduce potential gaps in the understanding of contracts. In one example, the service may be utilized by contract delivery leads or managers to better understand each contractual clause in the shortest possible time, enabling rapid engagement with the contract by providing access to intelligent, easy-to-digest insights, key highlights, and in some cases, recommendations for next steps regarding the drafting, execution of, and/or delivery on the contract. In some embodiments, the platform can be configured to calculate the risks associated with specific types of clauses in the contract, generate alerts for upcoming delivery deadlines, bring attention to clauses that are more likely to increase costs to a party, and/or identify critical clauses that are missing from the document. These calculations can serve a need by either party to accurately and expeditiously understand the risks associated with various aspects of a contract.

In other words, in different embodiments, the proposed systems and methods offer companies and other large entities the ability to manage their contract portfolios with a clearer, more complete awareness of the risks associated with the documents. In addition, such a service better equips contract draftsmen and reviewers with tools to more confidently prepare documents that judiciously represent their interests. This type of tool is critical in efforts to minimize negative estimate-at-completion (EAC) values, where a client generates no profit or may even face surprise escalations. Negative EAC values are due to penalty or loss of revenue resulting from a failure to meet the deliverables as per the clauses in the contract (which may have been too stringent). This condition can also be referred to as a negative profit margin value for or resulting from performance of a contract. As noted above, in some embodiments, the service can provide end-users with a tool by which a wide variety of ambiguous clauses can be detected in order to prevent or minimize misunderstandings between the parties. For example, ambiguity may surround penalty details that can lead to unlimited liability, SLA (service level agreement) clauses with no clear definition, liabilities or data breach clauses without a specific amount or contract value defined, scope of service or deliverables that are not adequately defined, third party dependencies that are identified but do not clearly define roles and responsibilities, milestones dates or timelines only generally specified rather than fixed dates, pricing structures without explicit values, lack of defined targets (e.g., productivity improvements, client satisfaction, etc.), ill-defined security clauses, and/or reference to others external documents such as a master agreement or annexed documents that are not actually provided or available in the accompanying list of documents.

Furthermore, in some embodiments, the service can be configured to determine if there are clauses or terms that are generally understood to be essential but are missing in the contract. For example, clauses related to security expectations, changes in management, ownership of tasks, protection against volume variations, scope of services, and/or baseline periods (the time at which a party is expected to take over and be responsible for the obligations outlined in the contract) can be overlooked to the detriment of the signing parties. Similarly, the service can be implemented to classify clauses that are associated with a higher level of risk and/or a specific type of risk category. Specificity of clauses that may increase the vulnerability of the client, such as evergreen warranties, unlimited liability, no (zero) baseline periods (such that penalties apply from the first day of contract commencement), requirements for the adoption of specific tools, narrow windows for deliverables or payment milestones, weak indemnity clauses, resource retention requirements, security commitments, and/or code quality expectations, can also be tagged and brought to the end-user's attention.

In some cases, contracts can be drafted with inadequate management or are otherwise misaligned with the client's expectations. Contracts may not fully capture expectations, scope, requirements, or assumptions from all key client stakeholders resulting in expectation mismatch between the parties, or the scope/deliverables were not adequately defined, leading to a mismatch between the parties. For example, some other risk-laden types of clauses that may be identified by the proposed system include incomplete or unrealistic human resource clauses, transferred liability for severance and pension, minimum retention requirements, compliance with certain laws or regulations without a provision for adequate compensation, contradictory contract terms, and unrealistic approval processes.

Thus, many contracts are weakened by unfavorable terms or missing protections, as well as ambiguous clauses and aggressive terms and conditions that created inappropriate risk. The proposed embodiments address and solve these issues. As will be discussed in greater detail below, in different embodiments, the system is configured to automatically detect the absence of important clauses, as well as the presence of aggressive (potentially biased, imbalanced, inequitable, or otherwise unreasonable clauses). The various types of ambiguous, missing, and/or specific clauses described above are then tagged by the service and brought to the attention of the end-user to promote a mindful, informed, and responsive approach to contract drafting, execution, and delivery.

As an overview for the reader, FIG. 1 introduces a generalized process flow for the lifecycle of a contract, and the central service roles provided by a contract risk analysis system ("contract system") 100. Generally, a contract moves through a sequence such as (a) presales, (b) qualification, (c) negotiation and sign off, (d) contract initiation, and (e) baselines. FIG. 1 provides a simplified depiction of this process. For example, in a first stage 110 ("Contract Design & Sign-off"), the parties seek an agreement and a contract is negotiated and designed that is intended to serve the needs of both parties. Typically, in first stage 110, end-users of contract system 100 may include solution architects, contract managers, legal team members, directors of delivery (DoDs), and project leads, among others. During this stage, contract system 100 may be queried by persons serving these roles to, for example, detect and highlight potential risks (e.g., terms such as an evergreen warranty, unlimited data liability, no baseline period, etc. or other specificity of clauses). In addition, the contract system 100 can be implemented to identify missing sections, ambiguity, as well as calculate the risk associated with a particular SLA.

In a second stage 120 ("Contract Initiation for Delivery Planning"), the parties move toward finalization, signing, and execution of the contract. Typically, in second stage 120, end-users of contract system 100 may include contract managers, legal team members, directors of delivery (DoDs), portfolio and project leads, among others. During this stage, contract system 100 may be employed, for example, to summarize and highlight key aspects of the contract (e.g., the scope, penalties, SLA configuration, liabilities, and stringent SLAs, etc.). Finally, in a third stage 130 ("Contract Execution/Delivery"), the contract becomes a living document that guides the actions and responsibilities of each party for as long as the contract remains in force. Some example end-users of contract system 100 in third stage 130 can include contract managers, directors of delivery (DoDs), portfolio and project leads, and delivery managers, among others. During third stage 130, contract system 100 can, for example, provide assistance in meeting delivery milestones, as well as identify any risks associated with delivery milestones, revenue flow, penalties, etc. In one embodiment, the system can be configured to generate proactive alerts or messages to specified persons connected to the contract in order to ensure continued awareness and responsiveness to various delivery and productivity commitments or milestones (see FIG. 11), such as alerts delivered before each baselining period or payment due date. In some embodiments, the system may be used to conduct SOP or other audits that verify the completeness of SOPs that can be performed using the contract system 100.

As will be discussed in further detail below, embodiments of the proposed system and method offer several benefits and conveniences for end-users. Some technical features include flexible implementation of the system through multiple, different interface channels and web applications, as well as availability of access control mechanisms that can regulate and/or limit access to contract-related data based on the role(s) associated with the end-user, enabling portions of the contract and other information to be protected as necessary. In addition, the system is configured to provide an OCR of non-digitized (scanned) contracts to ensure the full contract text may be queried (see FIG. 6).

Figure 2:
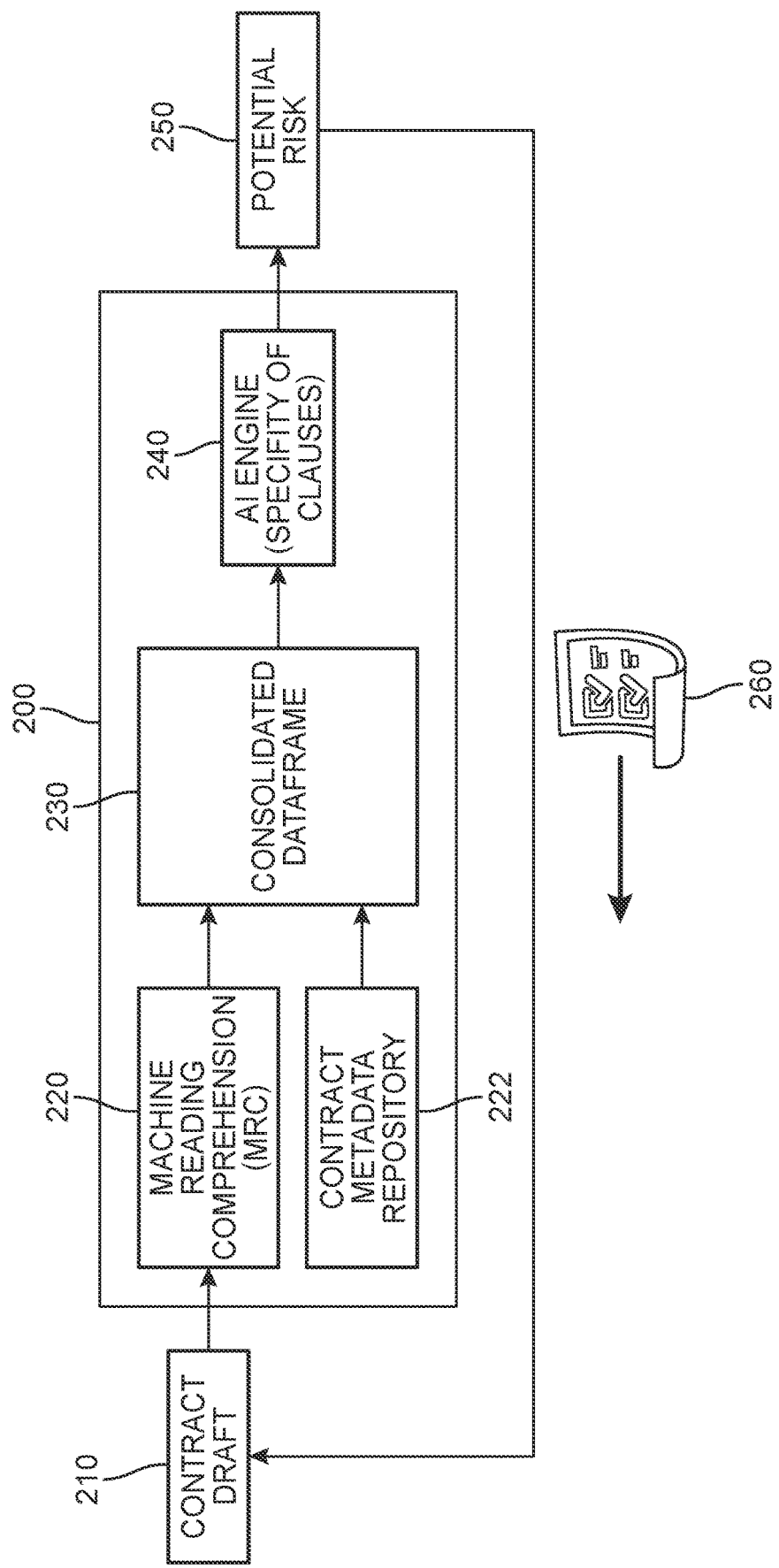
FIG. 2 is a flow diagram depicting an embodiment of an intelligent contract risk analysis subsystem for contract design and drafting.
Figure 3:
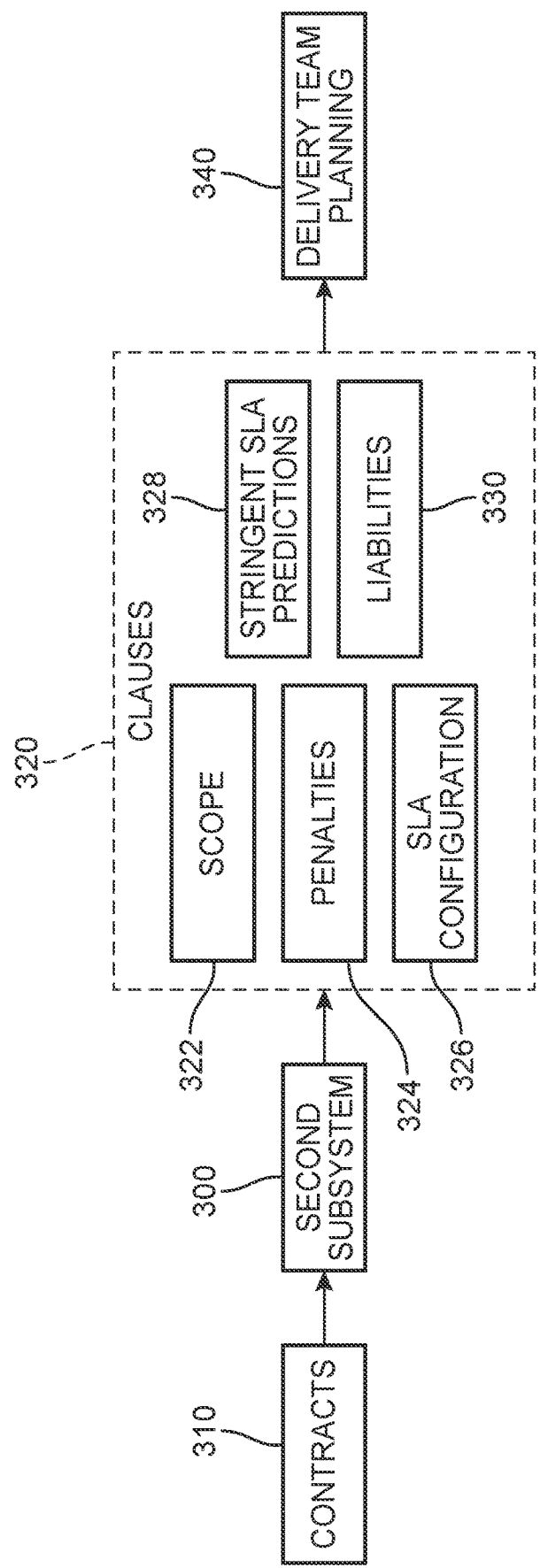
FIG. 3 is a flow diagram depicting an embodiment of an intelligent contract risk analysis subsystem for contract initiation.
Figure 4:
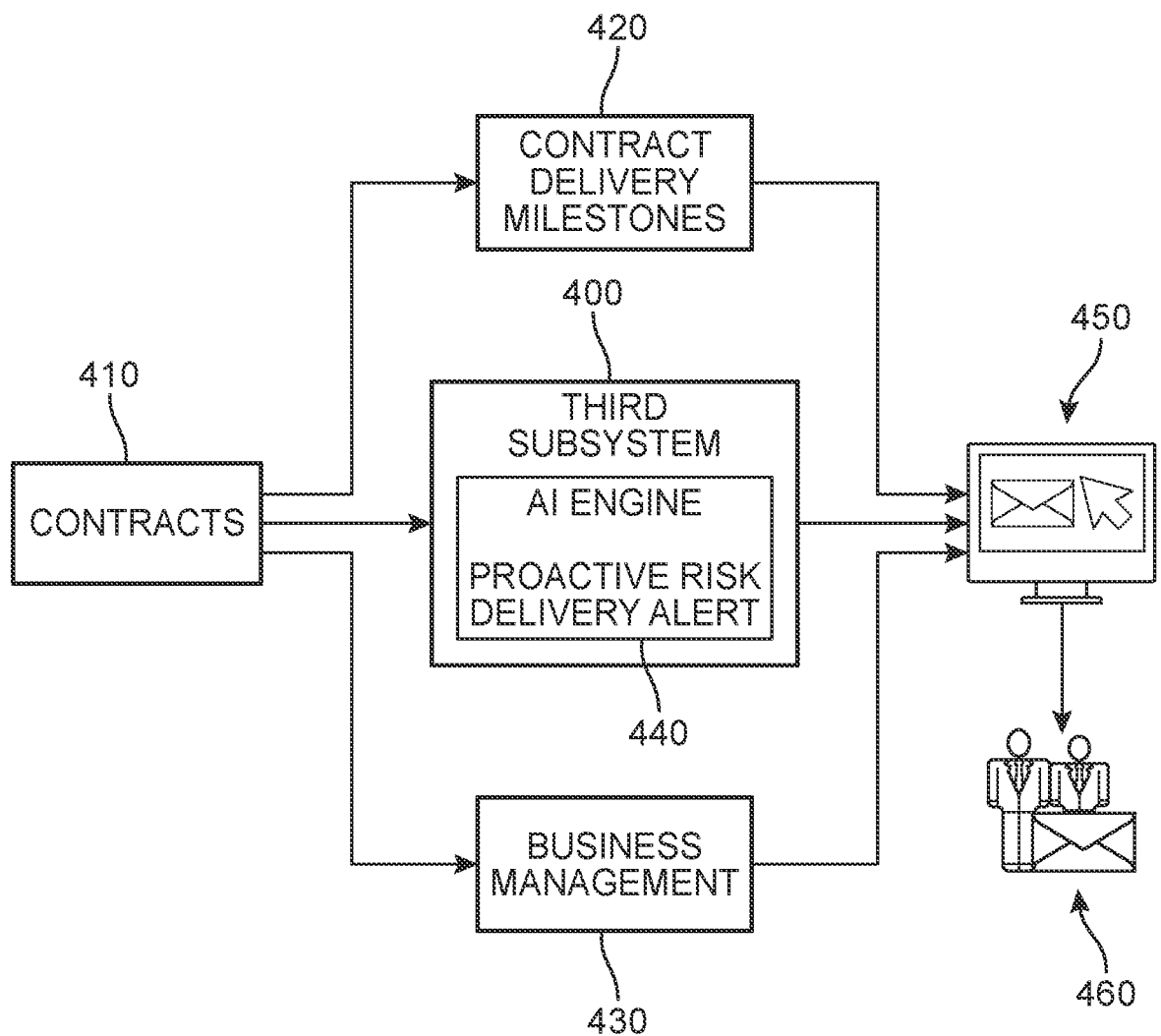
FIG. 4 is a flow diagram depicting an embodiment of an intelligent contract risk analysis subsystem for contract execution and delivery.

Referring now to FIGS. 2-4, three flow diagrams are provided to introduce some key features of the proposed system. In FIG. 2, an embodiment of a flow through a first contract risk analysis subsystem ("first subsystem") 200 is shown as implemented during contract design and sign-off (i.e., first stage). First subsystem 200 can include some or all of the components of the full contract system described herein. In order to better evaluate the potential risks in the contract, contract draft 210 can be submitted to first subsystem 200 in order to flag weak clauses. In this case, the draft 210 is received by a machine reading comprehension (MRC) module 220 including BERT or BERT-based models. The MRC module 220 processes the draft 210, the output of which is provided to a consolidated data-frame 230. The MRC module 220 can be configured to leverage deep learning models to identify and retrieve the relevant information from a contract based on a query from the user.

In some embodiments, a contract metadata repository 222 can supply information associated with previous (historical) contract records that resulted in penalties (e.g., market units, contract duration, etc.). The data-frame 230 then submits a request to an artificial intelligence engine 240 operating with a first machine learning model that is configured to classify the newly drafted contracts and highlight potential risks. In particular, this first model can determine whether potential risk factors 250 (e.g., evergreen warranty, unlimited data liability, no baseline period and other specificity of clauses) are present while the contract is being drafted. In addition, the AI engine 240 can be employed to identify SLA-related sections of the contract, and apply a second machine learning model that is configured to calculate risk levels with respect to specific SLAs as another type of risk factor. The AI engine 240 may also identify missing sections in the contract at this time as a type of risk factor. The risk factors 250 are described with reference to the draft as an output 260. The output 260 can be applied by end-users to reshape and revise the draft, which may lead to another query cycle through the first subsystem 200 until the contract is deemed acceptable by the end-user.

In FIG. 3, an embodiment of a flow through a second contract risk analysis subsystem ("second subsystem") 300 is shown as implemented during contract initiation delivery planning (i.e., second stage), where the contract has been finalized and signed, in order to facilitate awareness of the new contract's terms by team members involved in projects related to the contract. Second subsystem 300 can include some or all of the components of the full contract system described herein. For example, in FIG. 3 the contract(s) 310 are fed into the second subsystem 300 to automatically develop and generate an intelligent summary 320 for planning purposes. In this example, the summary 320 includes information regarding contract scope 322, penalties 324, SLA configuration 326, stringent SLAs 328, and liabilities 330 that is provided to a delivery planning team 340. Thus, the second subsystem 300 is configured to provide information on key clauses as well as intelligent predictions and recommendations.

In FIG. 4, an embodiment of a flow through a third contract risk analysis subsystem ("second subsystem") 400 is shown as implemented during contract execution and delivery (i.e., third stage), where the contract is in operation, in order to assist team members in contract performance. Third subsystem 400 can include some or all of the components of the full contract system described herein. For example, in FIG. 4 the contract(s) 410 are fed into the third subsystem 400 to automatically determine the tasks to be performed as well as generate alerts. The information is inputted into an artificial intelligence engine 440 operating with a third machine learning model that is configured to identify contract delivery milestones 420 and other important data (e.g., revenue flow, proximate risks, penalties, etc.), as well as business management tasks 430 that are necessary for maintaining a successful delivery schedule. With these data extracted, the third subsystem 400 is then configured to generate alerts and/or other communications 410 such as emails, text messages, automated phone calls, chatbot messages, etc. to project delivery team members 460. These alerts can relieve some of the burden on team members of continuous vigilance regarding both critical and basic aspects contract delivery, allowing them to rely on the intelligent contract system to keep them apprised and alerted to upcoming due dates and milestones.

Figure 5:
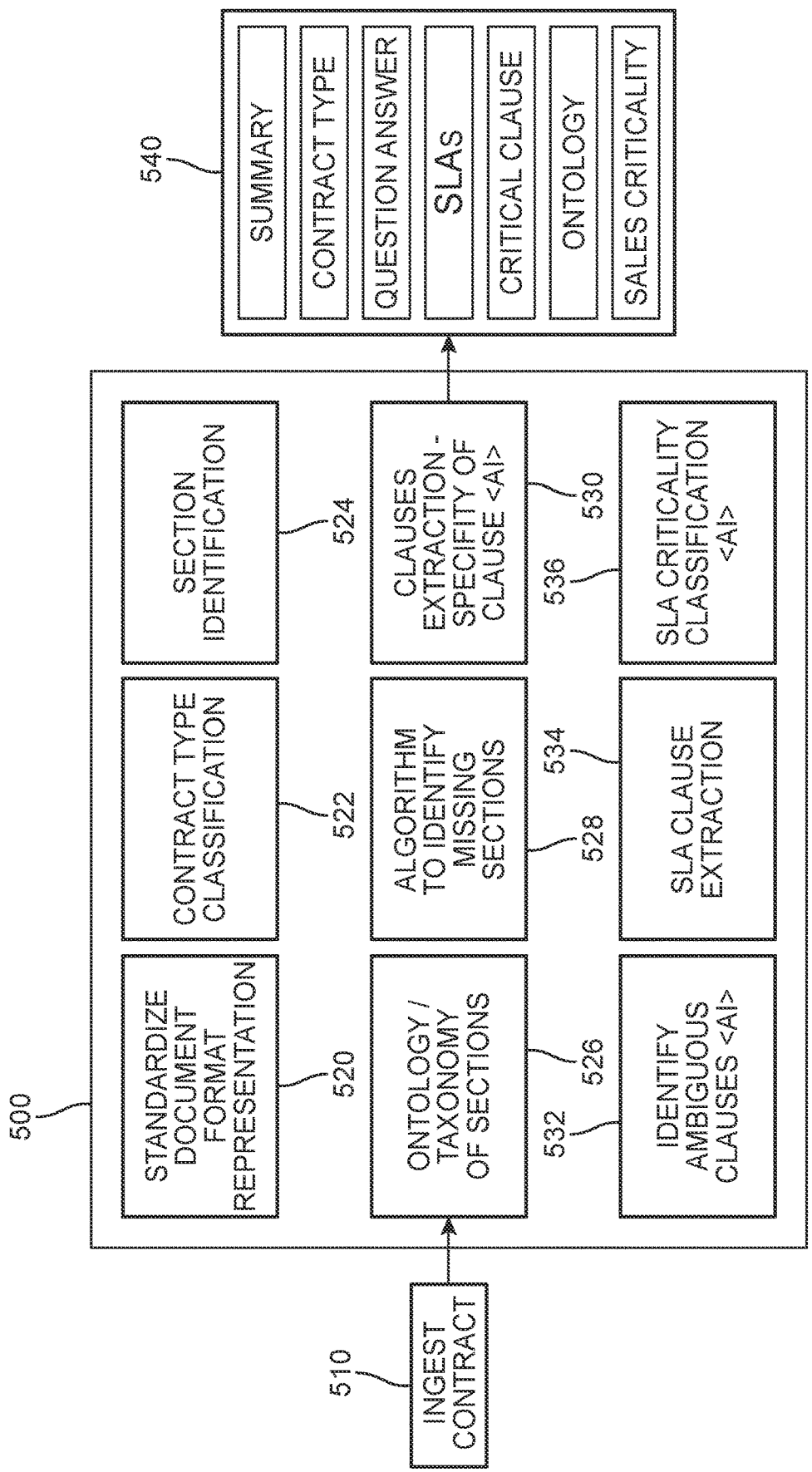
FIG. 5 is a schematic overview of an embodiment of some components of an intelligent contract risk analysis system for contract evaluations.

Referring next to FIG. 5, for purposes of context, an overview of some of the key components of an embodiment of a contract risk analysis system ("contract system") 500 for implementing aspects of the subsystems of FIGS. 2 and 3 is shown. As presented in FIG. 5, in an initial step 510 a contract can be ingested by the contract system 500. Once received by the contract system 500, the contract can be processed and analyzed across a series of modules. For example, at a first module 520, the format representation of the ingested contract is standardized (see FIG. 6). A second module 522 classifies the contract type, and a third module 524 identifies the various sections of the contract. A fourth module 526 is configured to recognize the ontology and/or taxonomy for each identified section, and a fifth module 528 identifies missing sections by reference to an intelligent algorithm. In addition, a sixth module 530 extracts higher-risk clauses via a specificity of clause model (see FIG. 7), and a seventh module 532 identifies ambiguous clauses. Furthermore, an eighth module 534 extracts SLA-related clauses, and a ninth module 536 calculates and assigns an SLA criticality level classification to the extracted clauses (e.g., High/Moderate/Low). The contract system 500 then presents an output 540 including one or more of a contract summary, type, response to a query, clause extract, SLAs, critical clauses, ontology, SLA criticality, etc.

As noted above, in some embodiments, the system includes a specialized optical character recognition (OCR) engine to generate digitized documents. In some implementations, the OCR engine may include an OmniPage OCR engine, a Google Cloud Vision API OCR engine, Microsoft Azure Computer Vision API OCR engine, an IBM Bluemix OCR engine, and/or the like. In some implementations, the OCR engine may convert the documents into an electronic format (e.g., the digitized documents). Optical character recognition involves a conversion of images of typed, hand-written, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, identification documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

Figure 6:
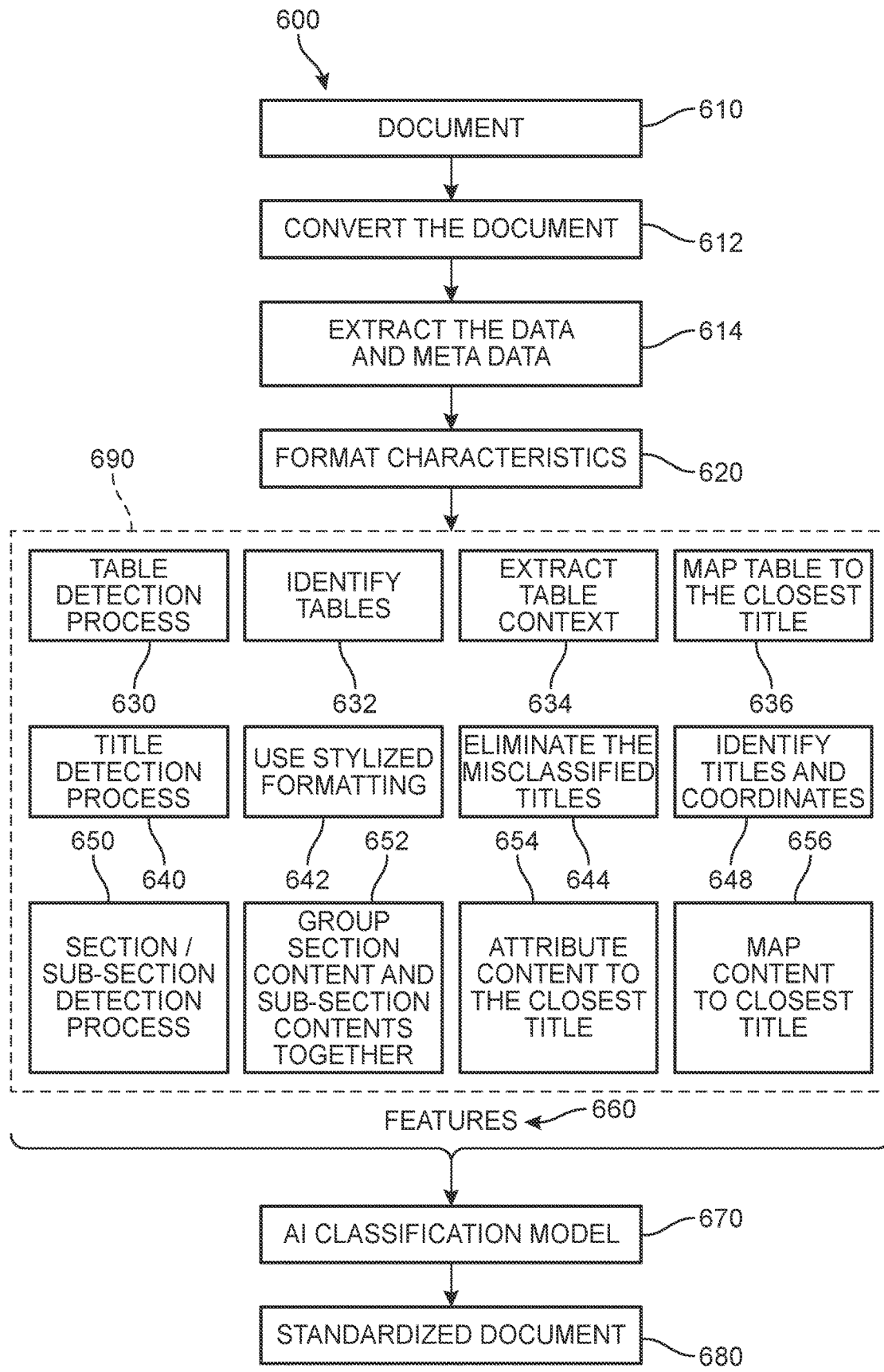
FIG. 6 is a schematic flow diagram of an embodiment of a process for document format standardization.

FIG. 6 depicts a flow diagram representing an overview of an embodiment of a document processing subsystem 600 for the contract risk analysis system. In a first step 610, contract and other documents are submitted to and received by the system. These documents may comprise a variety of formats that can encompass a wide variety of document structures, such as tabular structures, columns, images, table of contents, headers and footers, etc. In other words, at this stage, the system receives or otherwise ingests or captures pertinent documents. These document sources may be scanned copies of physical documents, such as paper receipts, or may be created as electronic documents, such as data files having a known digital document format such as comma-separately-values (.csv), portable-document-format (.pdf), spreadsheets, slides, etc.

In a second step 612, the document can be converted into a string of characters. For example, the document may be converted to HTML representation. The data and metadata for the document is extracted in a third step 614 and these extracted format characteristics 620 are provided to a format standardization engine/module 690. In some embodiments, the format standardization engine 690 can for example utilize and search and analytics engine such as ElasticSearch, Solr, Lucene, MongoDB, Algolia, and Splunk, or other search and analytics engines, as well as batch analytics engines, data formatting, searching, analysis and visualization processors, data libraries, and cloud storage for data archival.

Based on the received information, the type of document that has been submitted and its contents can be identified. For example, the format characteristics 620 can undergo one or more of a table detection process 630, a title detection process 640, and a section/sub-section detection process 650. As shown in FIG. 6, the table detection process 630 includes a first sub-step 632 of identifying tables within the document, for example through HLINE or VLINE scanning, a second sub-step 634 of extracting table content, which can also include generating HTML content and coordinates, and a third sub-step 636 of mapping the table to the closest title. In addition, the title detection process 640 includes a fourth sub-step 642 of using the presence of stylized formatting and other distinctive format aspects, such as font size, attribute variations, underlining, etc., a fifth sub-step 644 of eliminating the mis-classified titles, and a sixth sub-step 648 of identifying the titles and corresponding coordinates. Similarly, the section/sub-section detection process 650 includes a seventh sub-step 652 of grouping section content and sub-section content together, an eighth sub-step 654 of attributing content to the closest title, and a ninth sub-step 656 of mapping content to the closest title. Finally, these collective detected features 660 are provided to a deep learning-based AI classification model 670, configured to output the document in a standardized format, such as for example, JSON, which will be used in subsequent processing steps for clause extraction, as discussed below.

Figure 7A:
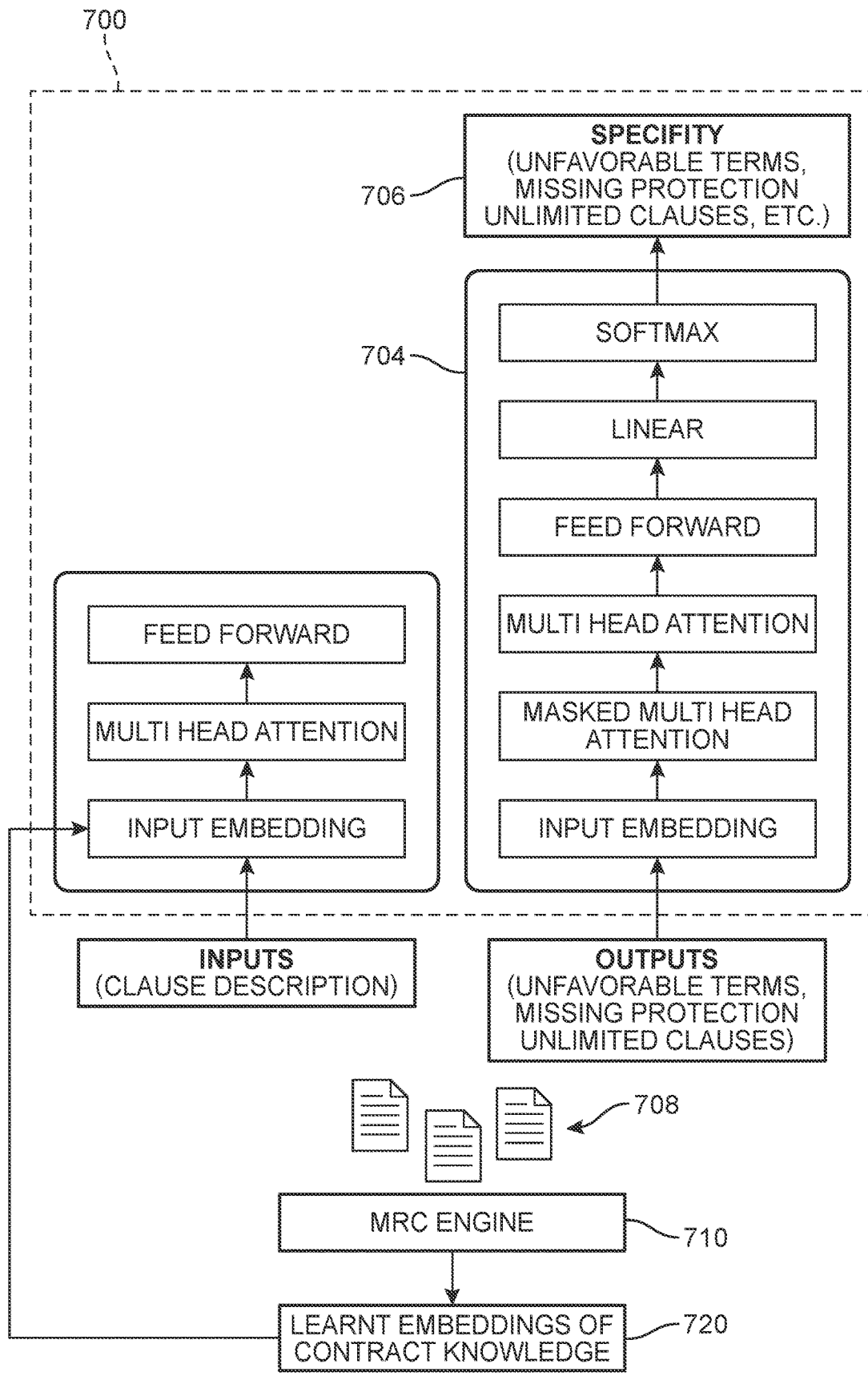
FIG. 7A is a schematic diagram of an embodiment of a specificity model for an intelligent contract risk analysis system.
Figure 7B:
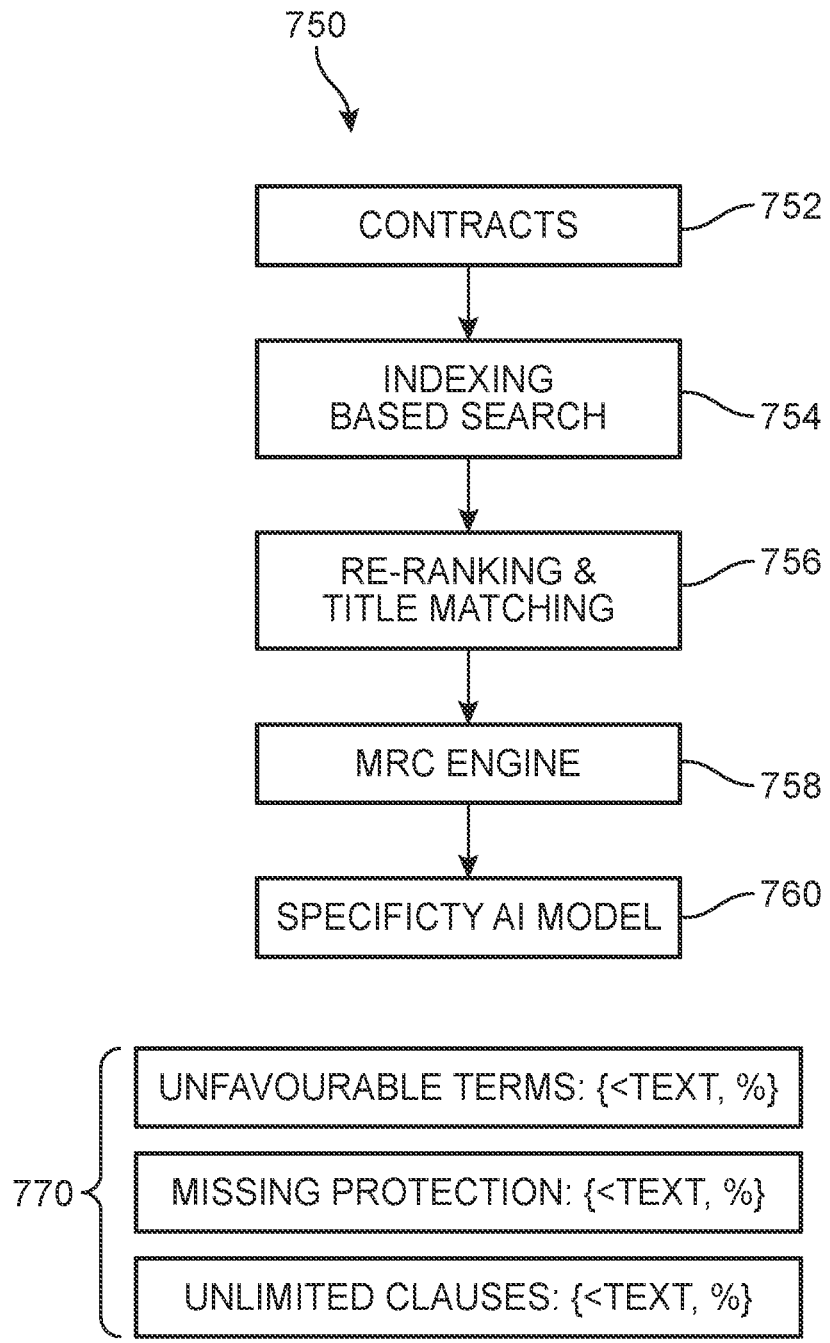
FIG. 7B is a process flow diagram of an embodiment of a specificity model for an intelligent contract risk analysis system.

It should be appreciated that the format standardization and segmentation discussed herein can substantially the accuracy of the system in identifying specificity of clauses, as well as in calculating risk levels for a given clause. For example, in different embodiments, the proposed system includes provisions for determining whether a portion or clause in the contract document may be categorized as a "strong" or "weak" clause, as noted earlier with respect to FIGS. 2 and 3. As illustrated in FIGS. 7A and 7B, in some embodiments, the clauses in the contract can be processed by a specificity of clauses model ("specificity model") 700. In FIG. 7A, a schematic diagram depicts the flow through the specificity model 700, beginning with the submission of documents 708 into an MRC Engine 710, generating a knowledge repository ("learnt embeddings of contract knowledge") 720 of past (historical) contracts and their classifications (e.g., Evergreen Warranty, Unlimited Data Liability, Lack of Indemnity, Transferred Liability for Severance, etc., and others as discussed earlier). This repository 720 is accessible by specificity model 700, as shown in FIG. 7A.

In different embodiments, the specificity model 700 represents a deep learning-based solution that is trained based on pre-existing contracts ingested by the MRC Engine 710. The specificity model 700 makes use of knowledge associated with the pre-existing clauses in these contracts which have already been classified, categorized, or otherwise identified previously (e.g., due to the contract being labeled as resulting in a negative EAC and/or positive EAC) as falling under a specific category/type. In one embodiment, the specificity model 700 is a supervised learning model, in which training inputs comprise "positive" and "negative" clause examples, and the model learns typical variations of each clause type. Each time a new contract is added to the repository 720, it will be fed to specificity model 700, which evaluates the specific clause(s) based on the formation of words in each sentence.

Thus, as shown in FIG. 7A, when inputs 730 (i.e., contract clause text and descriptions) are submitted to a first stage 702 of the specificity model 700, an input embedding step can pull data from repository 720 along with inputs 730 for processing by a first multi-head attention mechanism and forward feeding to a second stage 704 of specificity model 700. The second stage 704 includes two input ends, where output labels (identifying the category types that the clause may be assigned) are provided for input embedding, masked multi-head attention, and then collected with the inputs 730 fed by the first stage 702 for additional processing by a second multi-head attention mechanism. The transformed data is linearized and run through a softmax classifier, thereby classifying each clause under a specific category as appropriate, or noting the clause has no basis for a specificity classification as defined by the system.

For purposes of clarity, an example process flow diagram 750 for the specificity model 700 is presented in FIG. 7B. In a first step 752, a user submits a query regarding a particular contract (e.g., "What are the warranty clauses?"; "What are the liability terms?"; "What are the indemnity terms?", etc.). The system performs an indexing-based search in a second step 754, re-ranks and title matches the data in a third step 756, and then submits the processed data to the MRC Engine in a fourth step 758. The specificity model receives the clause information in a fifth step 760, and generates an output comprising the contract clauses classified under specific categories associated with the query (e.g., unfavorable terms, missing protection, unlimited clauses, etc.). in some embodiments, the model is also configured to calculate a level or percentage representing the magnitude of risk associated with the given clause in that category.

Figure 8A:
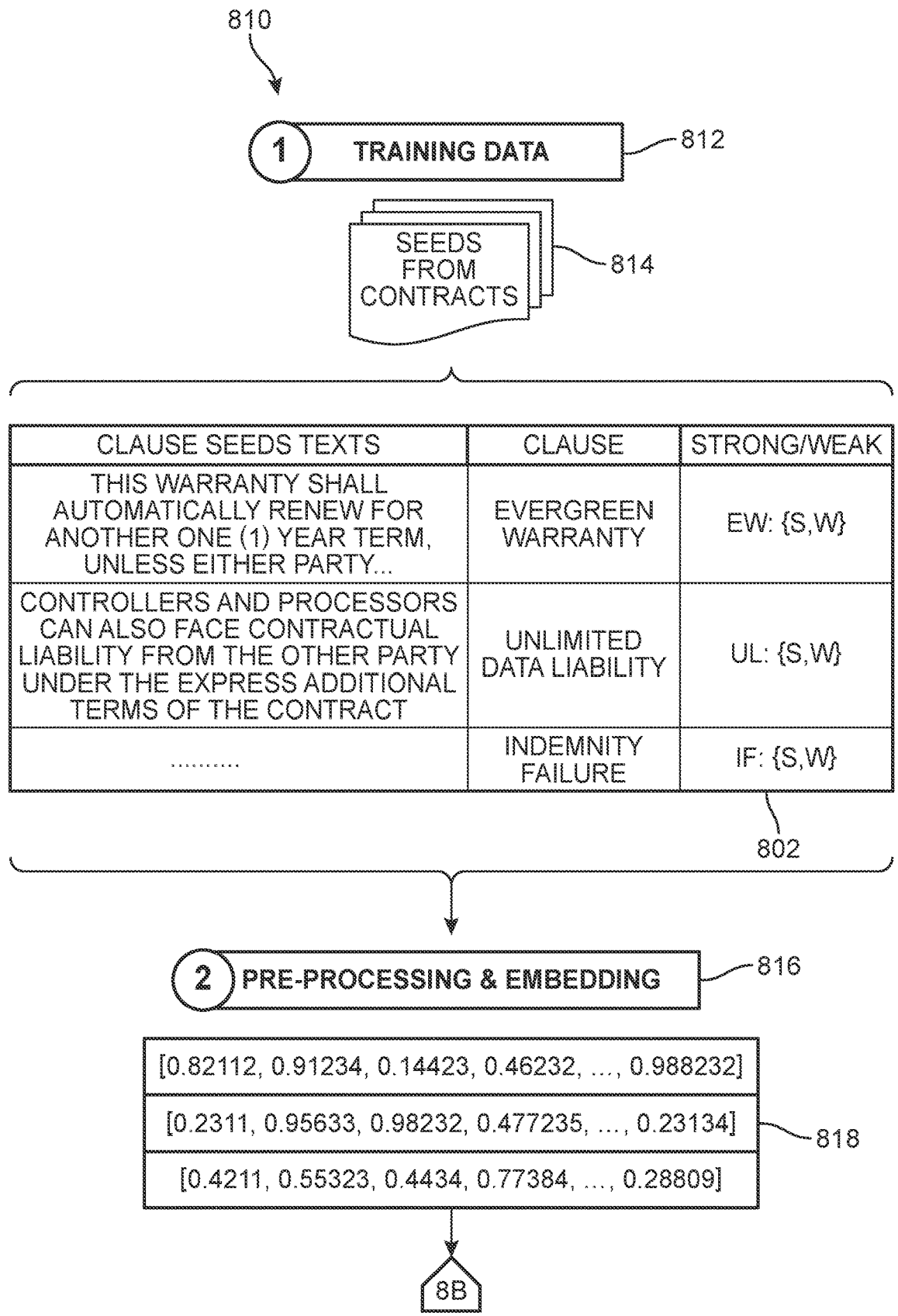
FIGS. 8A, 8B, and 8C present a schematic diagram of an embodiment of a process flow for a specificity model.
Figure 8B:
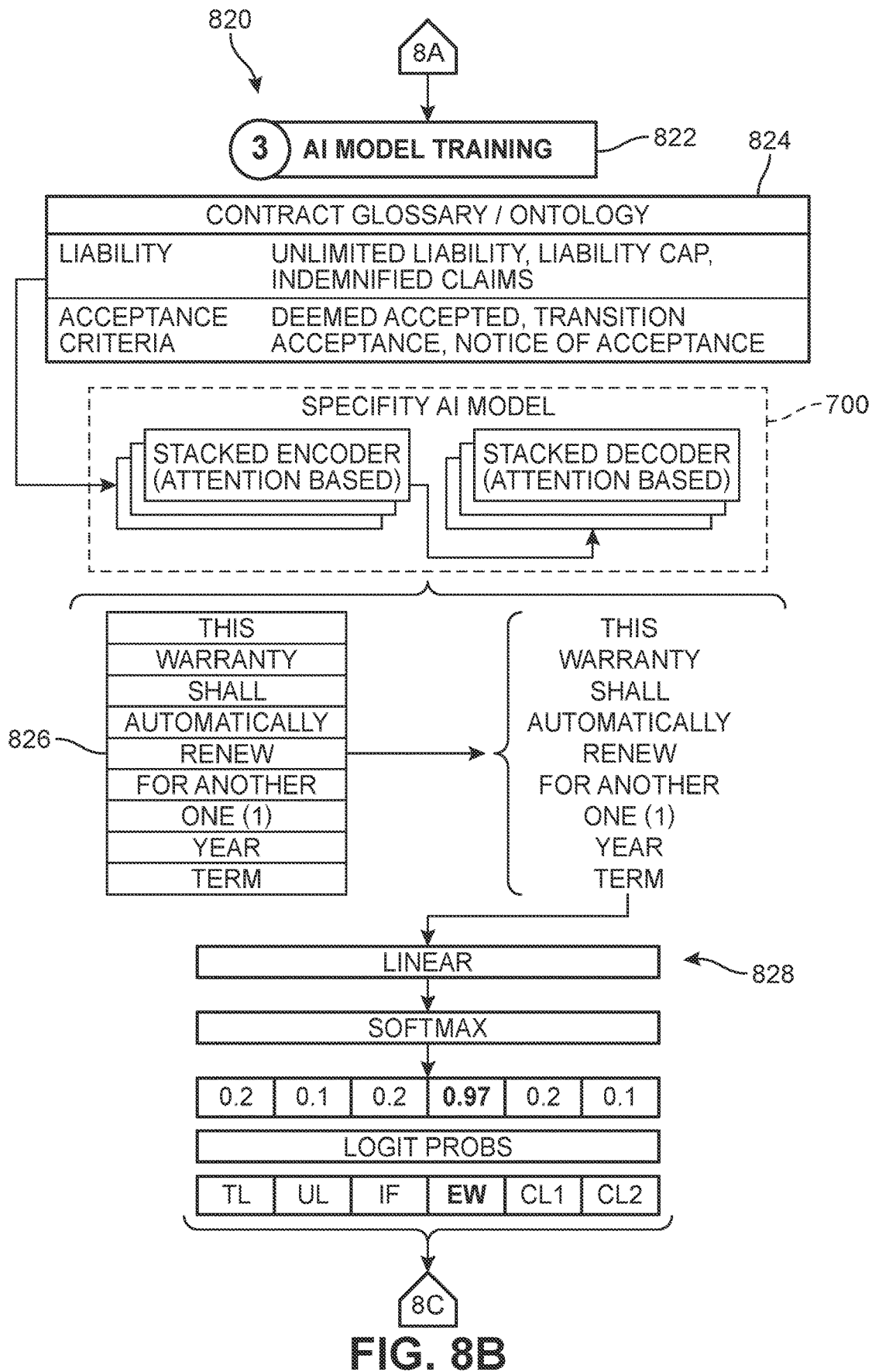
Figure 8C:
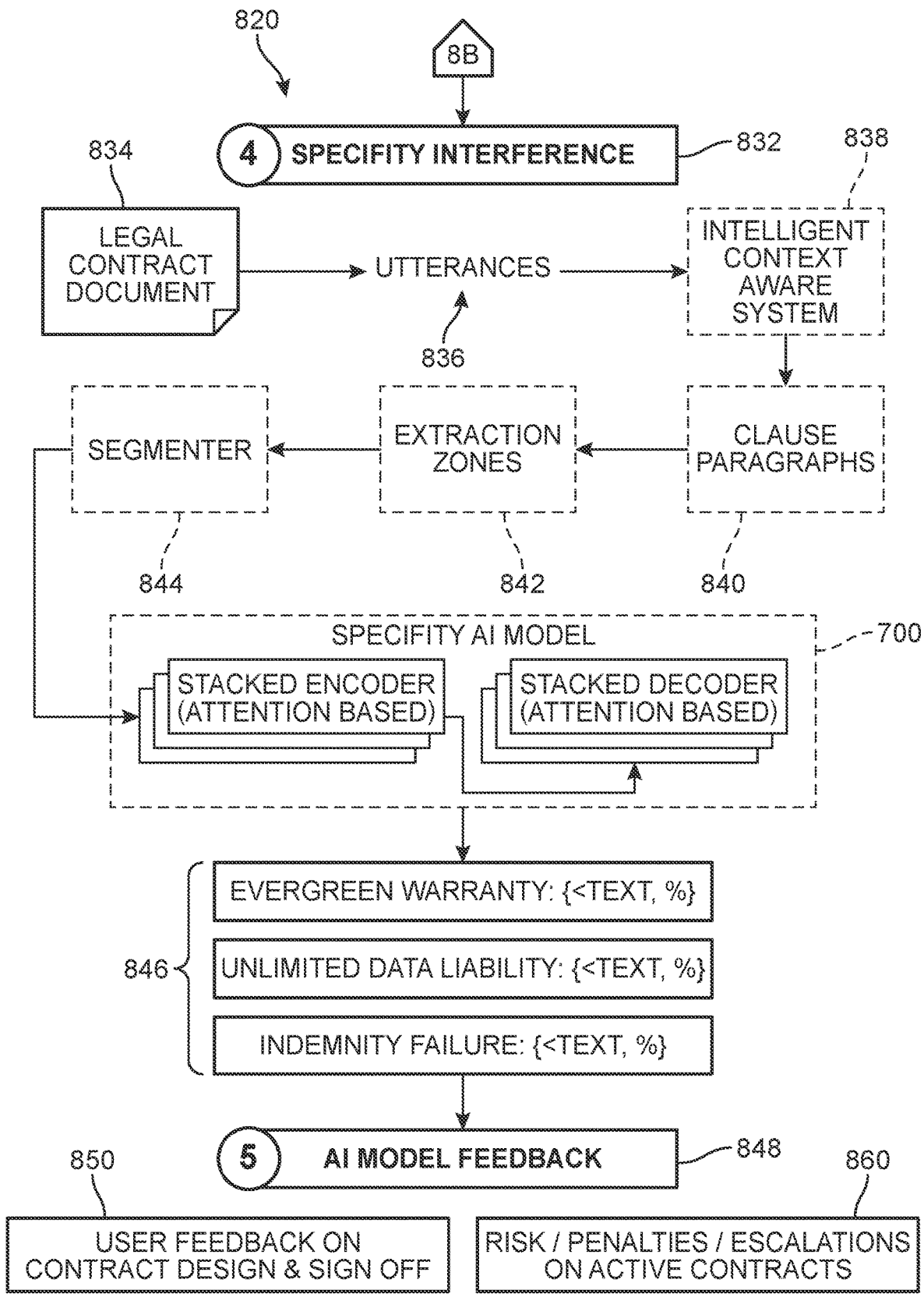

Additional details regarding the specificity model are now provided with reference to FIGS. 8A-8C. The flow shown in FIGS. 8A-8C has been broken up into three drawings for convenience to the reader, and should be understood to represent generally a single flow diagram with three sections that have been segmented only for purposes of reference. In FIG. 8A, a first process diagram 810 is shown in which training begins with the ingestion of training data by the model during a first stage 812. In this case, "seeds" of text 814 from contracts in which clauses have been previously tagged or assigned to specific categories are inputted. Simply for purposes of illustration, a first table 802 is shown in which these seeds 814 can be seen to comprise a set of clauses, clause category/label/classification, and clause risk level. As a first example, a first clause seed "this warranty shall automatically renew for another one (1) year term, unless either party . . . " has been labeled as an Evergreen Warranty (EW) clause, and can in some embodiments, have a "strong" (S) or "weak" (W) designation also assigned. A second clause seed example "Controllers and processors can also face contractual liability from the other party under the express additional terms of the contract. Unlimited provisions re: data protection . . . " has been labeled as an Unlimited Data Liability (UL) clause, and can also include a "strong" (S) or "weak" (W) designation. Similarly, a third example text (not shown) may be labeled as an Indemnity Failure (IF) clause, with an S/W designation. These data will be pre-processed and embedded 816 (i.e., via MRC Engine) as training input embeddings, an example of which is presented as a second table 818, during a second stage 816.

In FIG. 8B, a second process diagram 820 is depicted, whereby the artificial intelligence model training occurs in a third stage 822. In different embodiments, the specificity model 700 can receive the input generated from second stage 816 (see FIG. 8A), as well as additional knowledge 824, such as a contract glossary and/or ontology that may define pertinent terms (e.g., liability, acceptance criteria), and connections or relationships between various aspects of the contract. The specificity model 700 is configured to encode and decode the information, an example of which is presented in a third table 826, where each word or phrase in the first clause has been identified and key terms tagged (e.g., "automatically", "renew", "one", "year", "term"). As discussed above with respect to FIG. 7A, the data is processed by a linear algorithm and a softmax classifier, calculating logistical probabilities for each category. In FIG. 8B, the first clause ("This warranty shall automatically renew for another one (1) year term . . . " is assigned a probability for falling under the specific categories which in this example are UL (Unlimited Liability clause), IF (Indemnity Fail clause), EW (Evergreen Warranty clause), and CL1 and CL2 (placeholders representing additional possible category assignments). As can be observed in the probability table, the EW category is associated with the highest probability value of 0.97, which the model will use to interpret and classify future clause texts. In other words, the model learns a pattern to enable highly accurate classifications of clauses in future contracts.

An example of this is shown in FIG. 8C with a third process diagram 830. A fourth stage 832 ("specificity inference") corresponds to the use of the specificity model 700 to calculate and assign categories to new clause inputs for which no labels have yet been created. In a first step, a document 634 is first processed (e.g., see FIG. 6) to extract utterances 836 to isolate specific clauses within the larger contract. The utterances associated with a single clause are collected via an intelligent engine such as an intelligent context-aware system 838, and clause paragraphs 840 are identified based on the user's query about the document. Extraction zones 842 comprising intersections points between paragraphs are demarcated and provided to a segmenter 844 to segment each paragraph into sub-sequences with a specific window size and minimum frequency. The specificity model 700 receives this processed data and generates output 846 pertinent to the user query, typically including the relevant clause text, its classification, and a risk level probability value. Furthermore, in some embodiments, AI model feedback can occur in a fifth stage 840, where user feedback 850 regarding contract design and sign-off and/or risks, penalties, and escalation labels 860 linked to active contracts can be used to reinforce or retrain the model.

Figure 9:
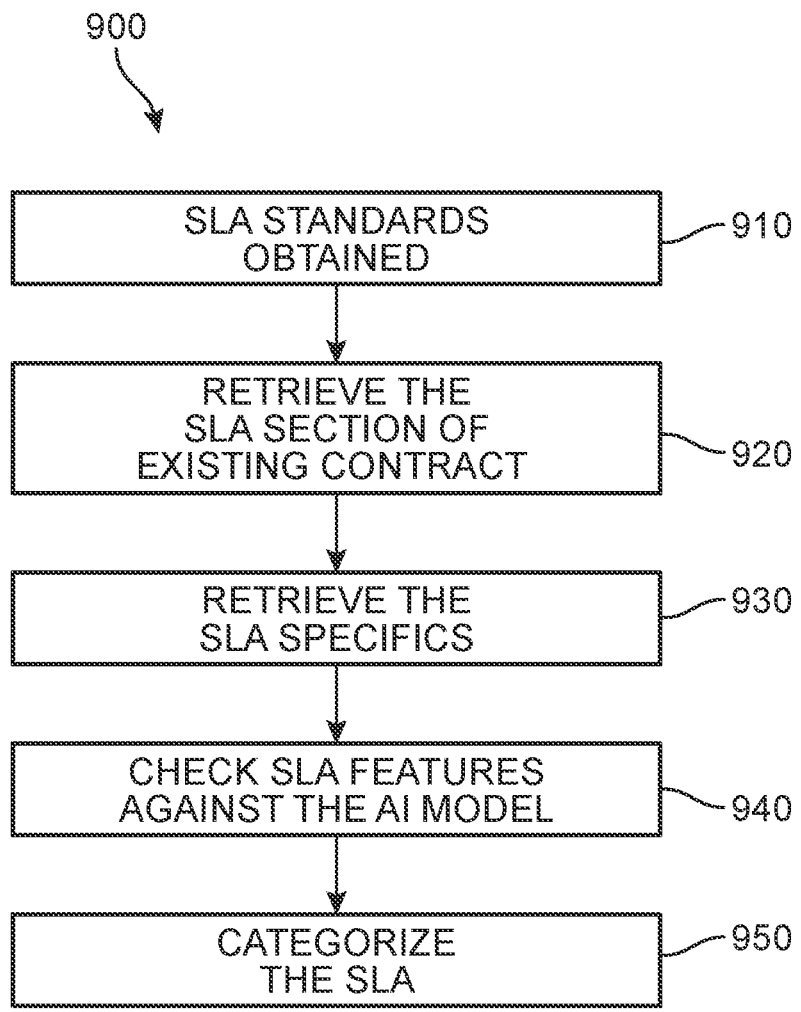
FIG. 9 is a flow diagram of an embodiment of a stringent SLA prediction process.

Referring next to FIG. 9, a flow diagram of an overview 900 of an embodiment of a process for generating stringent SLA predictions is shown. In a first step 910, SLA standards are provided to and/or accessed by the system. In some embodiments, the system is configured to refer to PCAT (Process Capability Assessment Tool) framework standards as a benchmark. In other embodiments, any other standard may be used by the system, based on the type of project(s) described in the contract, the industry in which the parties are working, etc. For purposes of illustration, a sample PCAT SLA standards chart is included below, where the letters "xx" and "yy" are placeholders for actual standard values:

| Application Development and Maintenance | Expected Service Level |
|---|---|
| Response Time Performance Incidents- Priority 1 | xx % responded to within yy min |
| Response Time Performance Incidents- Priority 2 | xx % responded to within yy min |
| Resolution Time Performance Incidents- Priority 1 | xx % resolved within yy Hours |
| Resolution Time Performance Incidents- Priority 2 | xx % resolved within yy Hours |
| Resolution Time Performance Incidents- Priority 3 | xx % resolved within y Business Days |
| Resolution Time Performance Incidents- Priority 4 | xx % resolved within yy Business Days |
| Resolution Time Performance Service Requests | xx % resolved within Agreed Timeframe |
| Critical Application Availability | xx % |
| Important Application Availability | xx % |
| Root Cause Analysis Priority 1 and Priority 2 | xx % |
|  | P1 within yy business days |
|  | P2 within yy Business Days |
| % Projects/Enhancements on Budget | xx % |
| % Projects/Enhancements on Schedule | xx % |
| Fault Density | 0.xxx |
| Defect Removal Effectiveness (DRE) | xx % |

In a second step 920, the SLA section of the contract is retrieved, and in a third step 930 the specifics for the SLA are retrieved. These SLA specifics and features are checked against the AI model in a fourth step 940, and categorized in a fifth step 950.

Figure 10A:
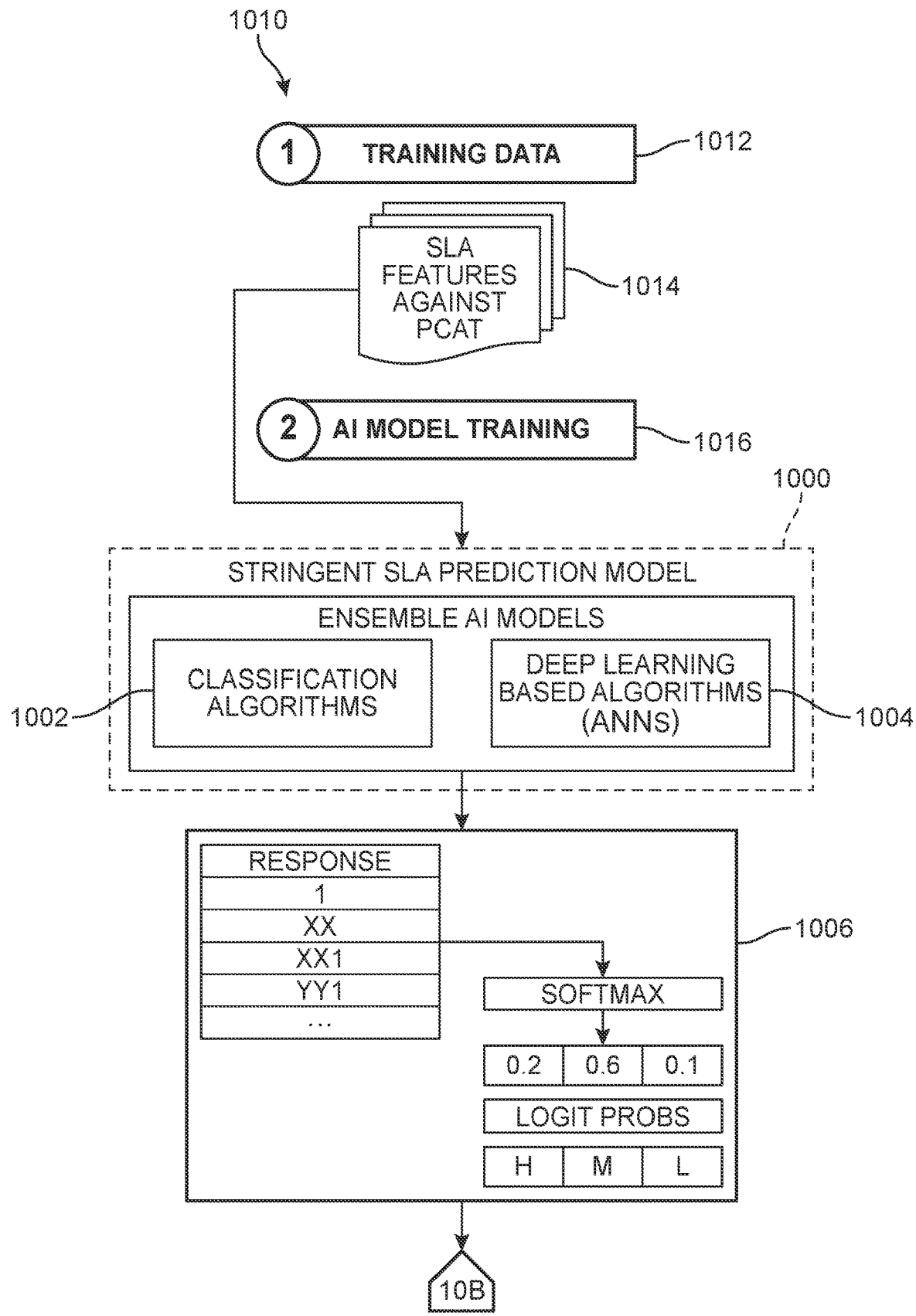
FIGS. 10A and 10B present a schematic diagram of an embodiment of a process flow for a stringent SLA model.
Figure 10B:
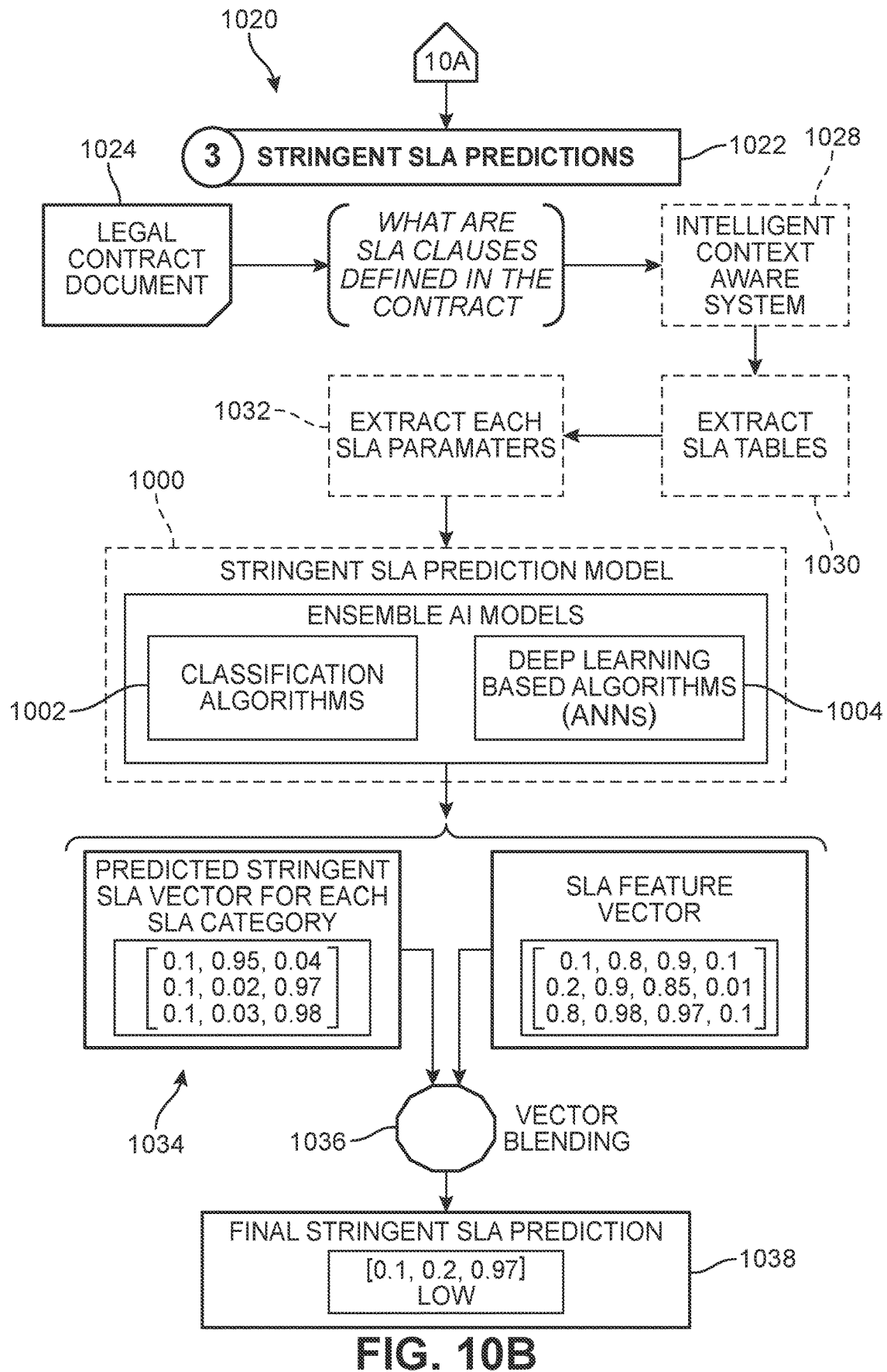

Additional context and details regarding this process is provided with reference to FIGS. 10A and 10B. The flow shown in FIGS. 10A and 10B has been broken up into two drawings for convenience to the reader, and should be understood to represent generally a single flow diagram with two sections. In FIG. 10A, a first process diagram 1010 is shown in which training of the model occurs, beginning with the ingestion of training data by the model during a first stage 1012. Simply for purposes of illustration, a sample set of training data chart is included below, where the letters "xx" and "yy" are placeholders for actual data values:

| SLA Category | Priority | PCAT Guidance % | PCAT Time | Contract Actual SLA Expectations % | Contract SLA Time | Contract Attributes | SLA Stringent Category |
|---|---|---|---|---|---|---|---|
| Response | 1 | xx | Yy | Xx1 | Yy1 |  | High |
| Response | 2 | xx | Yy | Xx1 | Yy1 |  | Medium |
| . . . | . . . | . . . | . . . | . . . | . . . | . . . | . . . |

-continued

| SLA Category | Priority | PCAT Guidance % | PCAT Time | Contract Actual SLA Expectations % | Contract SLA Time | Contract Attributes | SLA Stringent Category |
|---|---|---|---|---|---|---|---|
| Resolution | 1 | xx | Yy | Xx1 | Yy1 | | High |
| Resolution | 2 | xx | Yy | Xx1 | Yy1 | | Medium |
| ... | ... | ... | ... | ... | ... | | ... |
| App Availability | | Xx | | XX1 | | | Low |
| App Availability | | Xx | | XX1 | | | Low |
| ... | ... | ... | ... | ... | ... | | ... |
| Fault Density | ... | XX | | XX1 | | | High |

In this case, SLA features 1014 that have been compared against the chosen standard (e.g., PCAT) and pre-assigned stringent SLA prediction values are inputted into a stringent SLA prediction model ("SLA model") 1000. The data is processed by one or more classification algorithms 1002 and one or more deep learning-based algorithms (e.g., ANN models), and/or other ensemble learning AI models in order to train the model in a second stage 1016.

For purposes of illustration, an example training flow 1006 is depicted in which a table has been generated that extracts the pertinent values from the training data. In different embodiments, the SLA model 100 can receive the input from first stage 1012 as well as additional knowledge, such as a contract glossary and/or ontology that may define pertinent terms (e.g., key performance indicators), connections or relationships between various aspects of the contract, and SLA standards (e.g., response time, resolution time, priorities, etc.). The SLA model 1000 is configured to establish a classification paradigm using this information. In some embodiments, the data is processed by a linear algorithm and a softmax classifier, calculating logistical probabilities for each category. In FIG. 10A, the sample "Response Time" values (e.g., 1, xx, xx1, Yy, . . . ) are assigned a probability for falling under the specific categories which in this example are H (High Risk, indicating the SLA has deviated too far from standards), M (Moderate Risk, indicating the SLA is somewhat outside the range established by the standards), and L (Low Risk, indicating the SLA is aligned with the standards), though in other embodiments additional or alternative category names, types, and scales may be used. As can be observed in the probability table, the M category is associated with the highest risk probability value of 0.6, which the model will use to interpret and classify future SLA values. In other words, the model learns a pattern to enable highly accurate classifications of SLA-related clauses in future contracts.

An example of this is shown in FIG. 10B with a second process diagram 1020. A third stage 1022 ("stringent SLA predictions") corresponds to the use of the SLA model 1000 to calculate and assign risk levels to new SLA features/clauses for which no assessment has yet occurred. In a first step, an SLA-related query 1026 regarding a document 1024 is received by the system, and processed by an intelligent engine such as an intelligent context-aware system 1028. SLA tables 1030 are extracted, and from these tables each SLA parameter 1032 is also extracted. The extracted SLA parameters 1032 are provided to the SLA model 1000, which generates output 1034 (an example output is shown with sample values in FIG. 10B), including an SLA feature vector and a predicted stringent SLA vector for each SLA category. The two are blended together as blended input 1036 for a final stringent SLA prediction 1038 for the contract (an example prediction is shown in FIG. 10B). Thus, the SLA standard of a contract can be expeditiously contextualized and allow an end-user to quickly assess how their contract fares against existing SLA standards.

Figure 11:
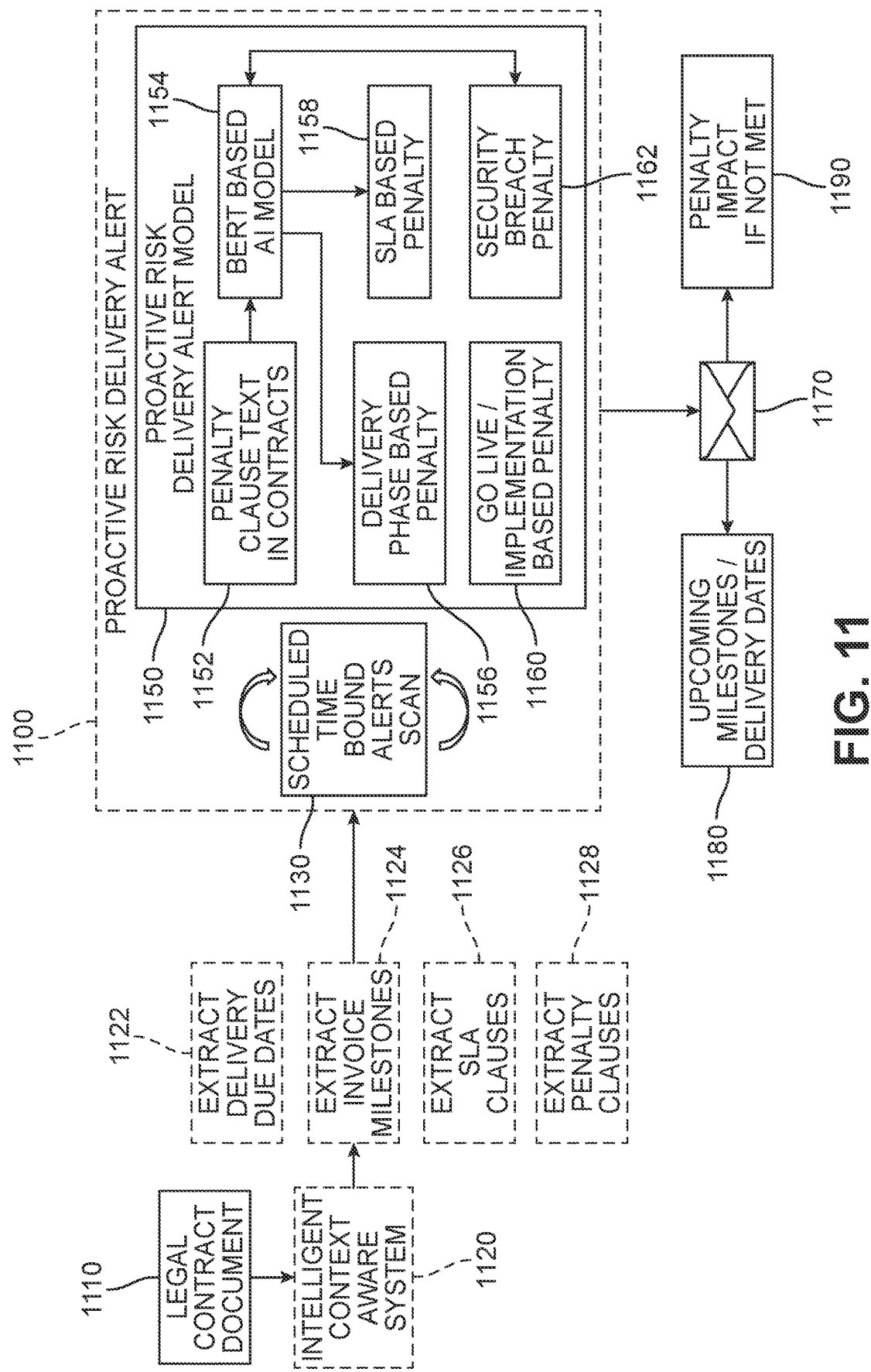
FIG. 11 is a schematic diagram of an embodiment of a proactive risk delivery alert system.

As noted earlier, in different embodiments, the system can be configured to generate automated communications based on dates established in the contract for particular events or milestones, and alerts in case of impending or missed deadlines. Referring to FIG. 11, an overview of an embodiment of a proactive alert subsystem 1100 is depicted. In a first step of this process, a document 1110 is processed via an intelligent engine such as an intelligent context-aware system 1120, thereby extracting one or more of delivery due dates 1122, invoice milestones 1124, SLA clauses 1126, and penalty clauses 1128, or other critical information. The extracted data is then provided to the proactive alert subsystem 1100.

The proactive alert subsystem 1100 uses this data to run a recurring scheduled time-bound alerts scan 1130, identifying upcoming delivery due dates, invoice milestones, etc. The key dates and corresponding contract text are sent to a risk delivery alert model ("alert model") 1150. The data, including clause sections citing penalties 1152 associated with these dates, are submitted to a BERT-based AI model 1154. The BERT-based AI model determines whether the dates are linked to one or more penalty types, including but not limited to delivery-phase based penalties 1156, SLA-based penalties 1158, Go-Live or implementation-based penalties 1160, and/or security breach penalties 1162. If the penalties for a particular event are determined, the system can be configured to automatically generate messages to persons who have been listed or registered with the system as being responsible for contract operations, or have been identified as being responsible for at least the specific aspect of the contract that is at risk of a breach or penalty.

Figure 12:
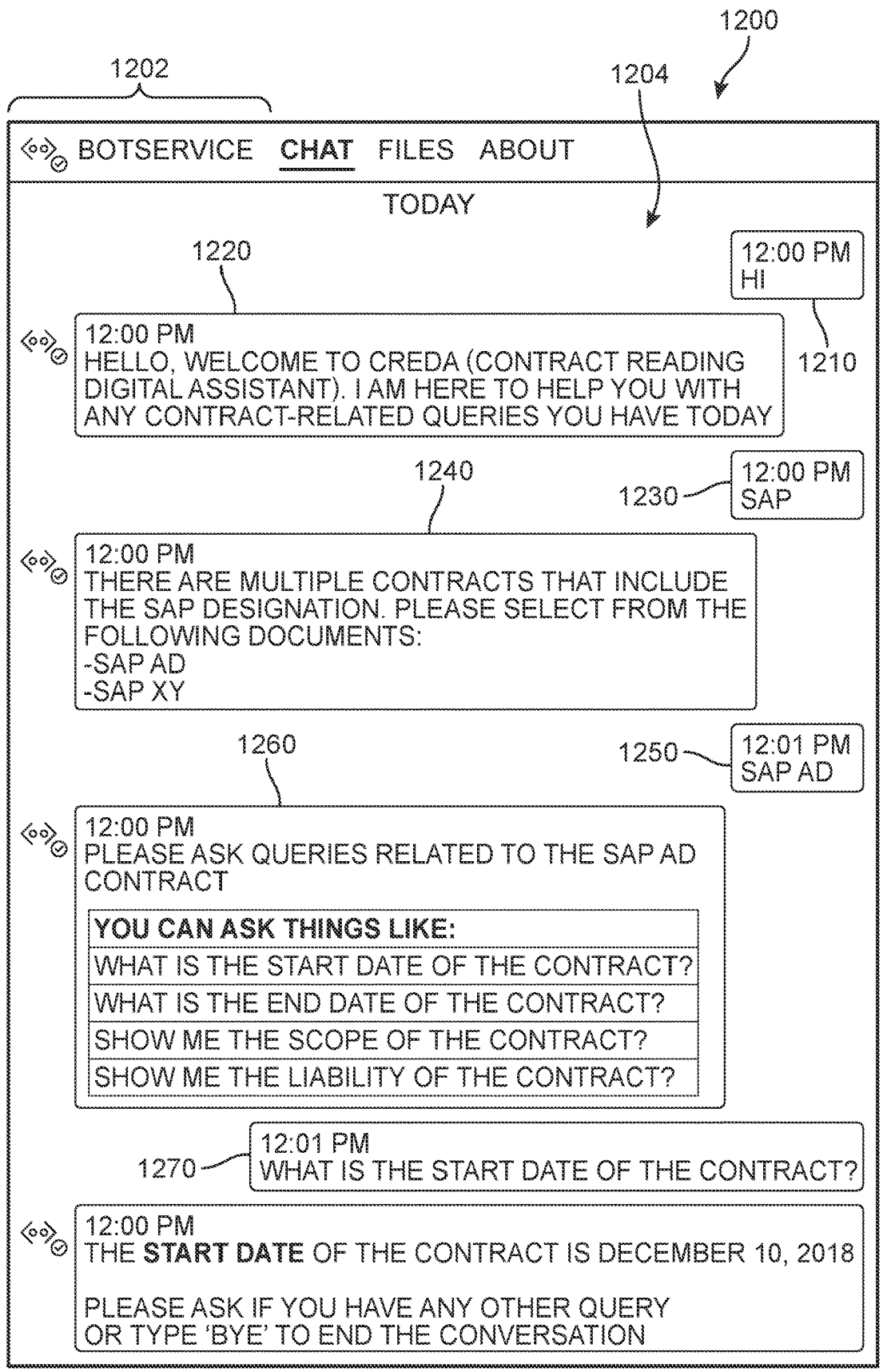
FIG. 12 is an example of a user-chatbot interface for accessing a contract risk analysis system, according to an embodiment.

For purposes of illustration, an example of a user interface ("interface") 1200 for engaging with aspects, features, and components of the systems described herein is shown in FIG. 12. In different embodiments, the interface 1200 can represent or serve as an access portal to an intelligent automated assistant, also referred to herein as a virtual assistant. Such an assistant allows users to interact with a device or system using natural language, in spoken and/or text forms. For example, a virtual assistant can be configured as an easy-to-use interface that receives and interprets user inputs, operationalizes the user's intent into tasks and parameters to those tasks, executes services to support those tasks, and produces output that is intelligible to the user. In some embodiments, the interface 1200 can be presented via a chat-type channel, such as on MS Teams®, Cisco Jabber®, Webex®, Bitrix24®, Rocket.Chat®, Zoom®, Slack®, Skype®, Wire®, Flock®, Google G Suite®, and other chat tool interfaces. For example, the systems described herein can be configured to work in concert with a virtual assistant that can converse with an end-user who submits contract-related queries through these types of chat apps.

For purposes of this application, a virtual assistant ("VA") may also be referred to as a virtual assistant system, a digital assistant, a digital assistant system, a digital personal assistant, and/or an automated agent. As a general matter, such terms should be understood to encompass a processing environment that is adapted to utilize spoken cues from utterances spoken in session to influence a render state for an interface serving as an activity session assistant. Thus, some or all of the processing environment may be referred to as, included in, and/or include the virtual assistant. Furthermore, a virtual assistant and associated systems for communicating with a virtual assistant may include one or more user devices, such as a computer, a server, a database, and a network. For example, a virtual assistant running on a server could communicate with a user over a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In embodiments where a user talks to a virtual assistant using a phone (e.g., a landline or a cell phone), the communication may pass through a telecom network and/or a wide area network. In addition, one or more resources of a virtual assistant may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

In different embodiments, the VA may be accessed via a user interface for the VA system. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

As shown in FIG. 12, an end-user is chatting with a botservice 1202 via interface 1200 on a chat channel 1204. The end-user initiates the conversation with an input 1210 ("Hi"), to which the botservice 1202 provides an automated first message 1220 welcoming the end-user to the service, and requesting the information needed to access the desired contract ("Hi! Welcome to CREDA (Contract Reading Digital Assistant). I am here to help you with any contract-related queries you have today. Please enter the Contract ID/Client Name"). The end-user provides a first response 1230 ("SAP"), and in response the botservice 1202 attempts to identify the pertinent contract with reference to its own inventory/contract repository. In this case, there are two contracts associated with the SAP label, and so the botservice 1202 generates an automated second message 1240 asking for clarification ("There are multiple contracts that include the SAP designation. Please select from the following documents: SAP AD, SAP XY").

When the end-user inputs a second response 1250 ("SAP AD"), he or she is automatically presented with a third message 1260 providing confirmation that the contract is available for queries to the system ("Please ask queries related to the SAP AD contract"). In addition, in some embodiments, the VA may present some sample queries to help the user better understand some possible avenues of exploration ("You can ask things like: what is the start date of the contract, what is the end date of the contract, show me the scope of the contract, show me the liability for the contract"). In this case, the end-user submits a first query 1270 ("what is the start date of the contract"). In response, the system determines the value that is being sought (start date), and automatically retrieves the desired information for presentation to the user in a fourth message 1280 ("The Start Date of the contract is Dec. 10, 2018. Please ask if you have any other query or type 'Bye' to end the conversation").

Figure 13:
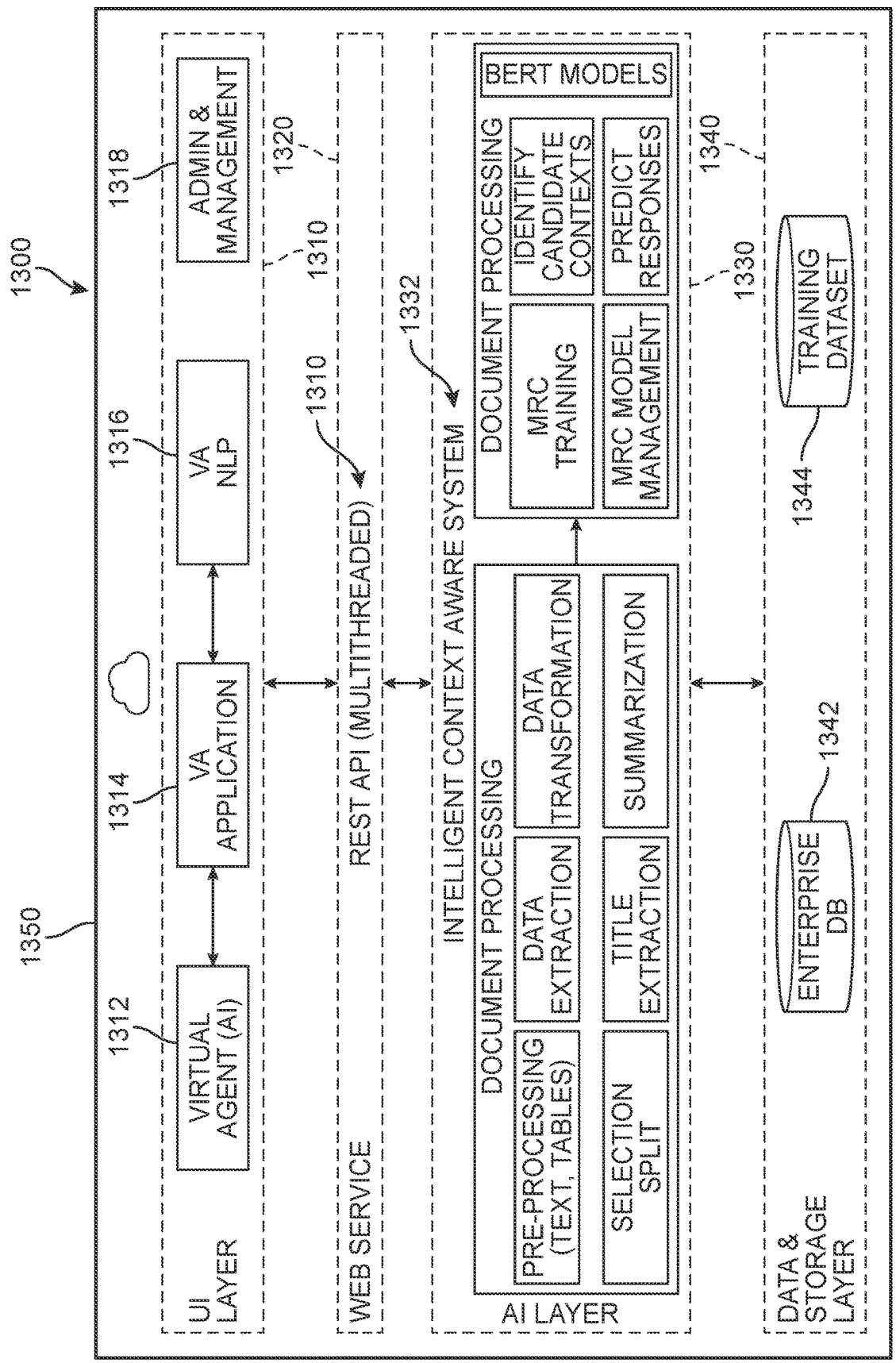
FIG. 13 is a schematic diagram of an embodiment of an architecture of an intelligent contract risk analysis platform.

One embodiment of a framework 1300 for a contract reading virtual assistant architecture is presented in FIG. 13. The framework in this example comprises four layers operating in a cloud computing environment 1350. The layers include a UI-layer 1310, a web service layer 1320, an AI layer 1330, and a data and storage layer 1340. In this case, the UI-layer 1310 includes an AI-based virtual agent 1312, a VA application 1314, an NLP (natural language processor) 1316 for the VA, and an administration and management module 1318. In different embodiments, natural language understanding services may include one or more of coreference resolution, chat language and emoticon, spelling correction, and sentiment and emotion analysis and/or may further include a template-based natural language generation module. A goal of the natural language understanding processor 1316 is to extract the meaning of the string of words inputted by the end-user. Once the appropriate information is retrieved, a dialogue management component can respond to the request/query in a conversational manner. The UI layer 1310 is configured to be in communication with the web service layer 1320 which includes a REST API 1310, which further communicates with AI layer 1330. In different embodiments, the AI layer 1330 includes an intelligent context aware system 1332 that provides contract document processing 1334 (e.g., pre-processing, data extraction, data transformation, selection splitting, title extraction, summarization, etc.), and machine comprehension (e.g., MRC training, MRC model management, candidate context identification, response prediction, BERT Models, etc.). Finally, the data and storage layer 1340 provides the framework 1300 with its repository of data, via an enterprise database 1342 and a training dataset 1344. In some embodiments, the data and storage layer 1340 is configured to retrieve and load contracts, as well as store contracts submitted via the UI layer 1310.

Figure 14:
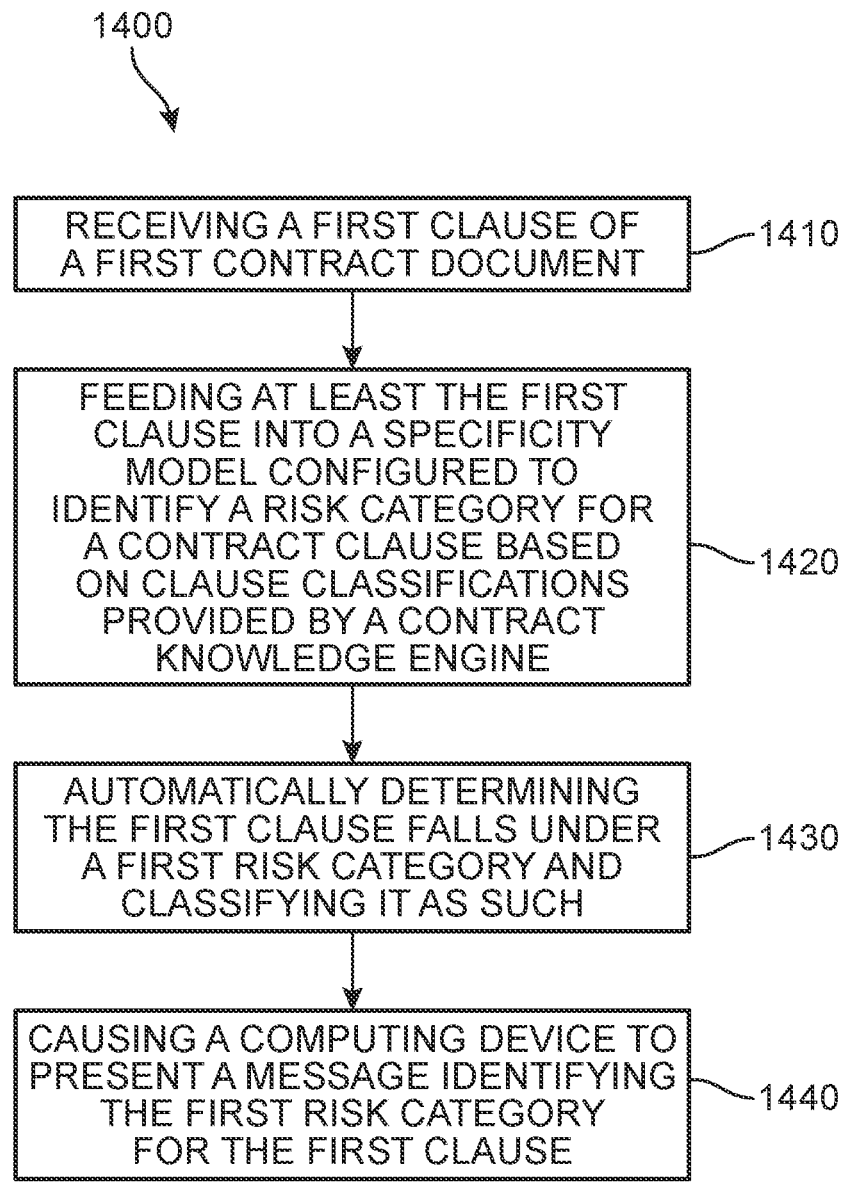
FIG. 14 is a flow chart depicting a method of determining a risk category for a contract clause, according to an embodiment.

FIG. 14 is a flow chart illustrating an embodiment of a method 1400 of determining a risk category for one or more clauses of a contract that has been submitted to and received by the system. As shown in FIG. 14, a first step 1410 of the method 1400 includes detecting one or more clauses of a first contract document. For example, document processing techniques such as format standardization and segmentation (see FIG. 6) may be applied to detect particular characteristics of the contract text and highlight or otherwise identify clauses including a particular content type. A second step 1420 includes feeding one clause of the one or more clauses into a specificity model configured to identify a risk category for a contract clause based on clause classifications provided by a contract knowledge engine. The method 1400 also includes a third step 1430 of automatically determining the one clause falls under a first risk category and classifying it as such (the first risk category), and a fourth step 1440 of causing a computing device to present a message identifying the first risk category for the one clause.

In other embodiments, the method may include additional steps or aspects. In some embodiments, the first risk category is one of an evergreen warranty, unlimited liability, unfavorable terms, missing protection, transferred liability, indemnity failure, no baseline period, and other similar risks in the contract. In another example, the method includes an additional step of receiving, at the contract knowledge engine, data from multiple contract documents including a plurality of clauses, whereby each clause of the plurality of clauses has been assigned a risk category. In some embodiments, the method can further include steps of automatically determining the one clause as being of a first risk level, where the message includes an identification of the first risk level for the one clause. For example, a risk level may be identified by a percentage (0%-100%) reflecting a probability of the clause representing a low or high risk and/or of the likelihood that the assigned risk category is correct. In some embodiments, the method also includes a step of automatically converting the one clause to a JSON format. In another example, the method includes a step of generating an alert identifying an upcoming milestone or delivery date associated with the first contract.

In different embodiments, the method can further include steps of receiving feedback via the computing device regarding an accuracy of the first risk category classification of the one clause, and automatically retraining the specificity model based on the received feedback. In another example, the method includes additional steps of: receiving a second contract document associated with a negative estimate-at-completion (EAC) or negative profit margin value, automatically identifying clauses in the second contract document that have a high likelihood of affecting EAC values, automatically classifying the identified clauses as being of a second risk category, storing the identified clauses and their classifications in the contract knowledge engine, and automatically retraining the specificity model based on the identified clauses and classifications.

In another example, the method also includes receiving a second contract document with a first service level agreement (SLA) section, extracting a first service level parameter from the first SLA section, feeding the first service level parameter into a stringent SLA model configured to identify a risk level of the first service level parameter based at least in part on Project Categorization (PCAT) framework standards, and generating an SLA risk level for the first service level parameter. In some embodiments, the method may also include steps of receiving a second contract document, automatically identifying a first delivery due date in the second contract document, and causing a computing device to present a notification identifying the first delivery due date prior to the first delivery due date. Furthermore, in some cases, the method also includes steps of receiving a second contract document, automatically extracting a clause describing or mentioning a penalty ("penalty clause") in the second contract document, automatically identifying a first penalty in the penalty clause, and causing a computing device to present a notification identifying the first penalty prior to a delivery due date associated with the penalty clause.

In some other embodiments, the methods described herein can also include one or more steps of submitting documents into an MRC Engine, generating a knowledge repository of past (historical) contracts and their classifications (e.g., Evergreen Warranty, Unlimited Data Liability, Lack of Indemnity, Transferred Liability for Severance, etc., and others as discussed earlier), receiving training inputs comprising "positive" and "negative" clause examples, pulling data from the knowledge repository along with new inputs for processing by a first multi-head attention mechanism, forward feeding the data to generate output labels (identifying the category types that the clause may be assigned) for input embedding, masked multi-head attention, processing/transforming the data by a second multi-head attention mechanism, linearizing the transformed data, running the data through a softmax classifier, classifying each clause under a specific category as appropriate, and/or determining the clause has no basis for a specificity classification as defined by the system. In another example, the methods described herein can further include steps of receiving data corresponding to SLA standards, retrieving an SLA section of a contract, determining/identifying the specific details and features for the SLA, checking and comparing these against the SLA model, and categorizing the features. The model can be trained by ingestion of training data by the model, such as SLA features that have previously been compared against the chosen standard (e.g., PCAT) and include pre-assigned stringent SLA prediction values. The data is processed by one or more classification algorithms and one or more deep learning-based algorithms (e.g., ANN models), and/or other ensemble learning AI models in order to train the SLA model.

Other methods can also be contemplated within the scope of this disclosure. For example, a method of calculating risk levels for clauses in a contract includes a first step of receiving, via a chatbot interface, a first request for an evaluation of a first contract (where the system causes a computing device to present the chatbot interface to an end-user). A second step includes identifying a plurality of clauses in the first contract, and a third step includes feeding the plurality of clauses into a specificity model configured to calculate a risk level for each contract clause based on clause classifications provided by a contract knowledge engine/repository. In addition, the method includes a fourth step of automatically assigning each of the plurality of clauses a risk level, and a fifth step of causing a computing device to present, via the chatbot interface, a first message identifying the risk levels for each of the plurality of clauses.

In other embodiments, the method may include additional steps or aspects. In some embodiments, the method also includes automatically classifying each of the plurality of clauses as belonging to a specific type of risk category, where the first message includes an identification of the risk categories for each of the plurality of clauses. In another example, the method further includes steps of automatically detecting a first service level agreement (SLA) section of the first contract, extracting at least a first service level parameter from the first SLA section, feeding the first service level parameter into a stringent SLA model configured to identify a degree of risk associated with the first service level parameter, and causing the computing device to present, via the chatbot interface, a second message identifying the degree of risk associated with the first service level parameter. In some embodiments, the stringent SLA model is configured to identify at least one of a response time and a resolution time specified by the first service level parameter.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of determining a risk category for a contract clause, the method comprising:
 receiving, at a server, seeds of text from contract documents, each seed having been assigned a risk category from a set of risk categories, the set of risk categories including an evergreen warranty, unlimited liability, unfavorable terms, missing protection, transferred liability, indemnity failure, and no baseline period;
 passing the seeds of text through a multi-head attention mechanism and a feed forward mechanism to produce processed seeds of text;
 feeding an artificial intelligence specificity model training inputs including:
  the processed seeds of text,
  the assigned risk category for each seed of text, and
  a contract ontology defining pertinent terms and relationships between various aspects of the contract,
 thereby training the specificity model to classify contract clauses into a risk category;
 receiving, at the server and from a first computing device, a first contract document and a first query regarding a risk associated with a first clause in the first contract document;
 feeding the first clause into the specificity model;
 automatically determining, via the specificity model, that the first clause falls under a first risk category of the set of risk categories;
 extracting, from the first contract document, a penalty clause associated with the first risk category;
 causing a computing device to present a message identifying the first risk category for the first clause as well as information about the penalty clause;
 receiving feedback via the computing device regarding an accuracy of the first risk category classification of the first clause; and
 automatically retraining the specificity model based on the received feedback.

2. The method of claim 1, wherein the message further includes recommendations for next steps regarding drafting, execution of, and/or delivery on the first contract document.

3. The method of claim 1, further comprising performing a recurring scheduled alerts scan to identify upcoming delivery due dates in the first contract document.

4. The method of claim 3, further comprising automatically determining if the due dates are linked to one or more penalty types, the penalty types including delivery-phase based penalties, SLA-based penalties, implementation-based penalties, and security breach penalties.

5. The method of claim 4, further comprising automatically generating an alert identifying an upcoming delivery due date associated with the first contract and the penalty type linked to the upcoming delivery due date.

6. The method of claim 1, wherein the message also includes an intelligent summary about the first contract document including a contract scope, penalties, SLA configuration, stringent SLAs, and liabilities.

7. The method of claim 1, further comprising:
 receiving a second contract document associated with a negative profit margin value;
 automatically identifying clauses in the second contract document that have a high likelihood of affecting negative profit margin values;

storing the identified clauses in a contract knowledge engine; and automatically retraining the specificity model based on the identified clauses, and metadata related to the second contract document.

8. The method of claim 1, further comprising:

receiving a second contract document with a first service level agreement (SLA) section;

extracting a first service level parameter from the first SLA section;

feeding the first service level parameter into a stringent SLA model configured to identify a risk level of the first service level parameter based at least in part on Project Categorization (PCAT) framework standards, the risk level referring to a probability of the first SLA section being classified under one of three risk classifications including a high risk classification, a moderate risk classification, and a low risk classification;

assigning, to the first SLA section, a first risk classification corresponding to one of the three risk classifications; and presenting, at the computing device, the assigned first risk classification for the first SLA section.

9. The method of claim 8, wherein:

the first SLA section being assigned to the high risk classification indicates the first SLA section has deviated too far from PCAT framework standards, the first SLA section being assigned to the moderate risk classification indicates the first SLA section is somewhat outside the range established by the PCAT framework standards, and the first SLA section being assigned to the low risk classification indicates the first SLA section is aligned with the PCAT framework standards.

10. The method of claim 9, further comprising receiving a draft contract document;

identifying, via an artificial intelligence engine, a first missing section in the draft contract document; and causing a computing device to present a notification identifying the first missing section prior to execution of the draft contract document.

11. A system for determining a risk category for a contract clause, the system comprising:

one or more computers and one or more storage devices storing instructions that are operable, when executed by the one or more computers, to cause the one or more computers to:

receive, at a server, seeds of text from contract documents, each seed having been assigned a risk category from a set of risk categories, the set of risk categories including an evergreen warranty, unlimited liability, unfavorable terms, missing protection, transferred liability, indemnity failure, and no baseline period;

pass the seeds of text through a multi-head attention mechanism and a feed forward mechanism to produce processed seeds of text;

feed an artificial intelligence specificity model training inputs including:

the processed seeds of text, the assigned risk category for each seed of text, and a contract ontology defining pertinent terms and relationships between various aspects of the contract, thereby training the specificity model to classify contract clauses into a risk category;

receive, at the server and from a first computing device, a first contract document and a first query regarding a risk associated with a first clause in the first contract document;

feed the first clause into the specificity model;

automatically determine, via the specificity model, that the first clause falls under a first risk category of the set of risk categories;

extract, from the first contract document, a penalty clause associated with the first risk category;

cause a computing device to present a message identifying the first risk category for the first clause as well as information about the penalty clause;

receive feedback via the computing device regarding an accuracy of the first risk category classification of the first clause; and automatically retrain the specificity model based on the received feedback.

12. The system of claim 11, wherein the instructions further cause the one or more computers to:

receive a second contract document with a first service level agreement (SLA) section;

extract a first service level parameter from the first SLA section;

feed the first service level parameter into a stringent SLA model configured to identify a risk level of the first service level parameter based at least in part on Project Categorization (PCAT) framework standards, the risk level referring to a probability of the first SLA section being classified under one of three risk classifications including a high risk classification, a moderate risk classification, and a low risk classification;

assign, to the first SLA section, a first risk classification corresponding to one of the three risk classifications; and present, at the computing device, the assigned first risk classification for the first SLA section.

13. The system of claim 11, wherein the instructions further cause the one or more computers to perform a recurring scheduled alerts scan to identify upcoming delivery due dates in the first contract document.

14. The system of claim 13, wherein the instructions further cause the one or more computers to automatically determine if the due dates are linked to one or more penalty types, the penalty types including delivery-phase based penalties, SLA-based penalties, implementation-based penalties, and security breach penalties.

15. The system of claim 14, wherein the instructions further cause the one or more computers to automatically generate an alert identifying an upcoming delivery due date associated with the first contract and the penalty type linked to the upcoming delivery due date.

16. A non-transitory computer-readable medium storing software comprising instructions executable by one or more computers which, upon such execution, cause the one or more computers to:

receive, at a server, seeds of text from contract documents, each seed having been assigned a risk category from a set of risk categories, the set of risk categories including an evergreen warranty, unlimited liability, unfavorable terms, missing protection, transferred liability, indemnity failure, and no baseline period;

pass the seeds of text through a multi-head attention mechanism and a feed forward mechanism to produce processed seeds of text;

feed an artificial intelligence specificity model training inputs including:
the processed seeds of text,
the assigned risk category for each seed of text, and
a contract ontology defining pertinent terms and relationships between various aspects of the contract,
thereby training the specificity model to classify contract clauses into a risk category;
receive, at the server and from a first computing device, a first contract document and a first query regarding a risk associated with a first clause in the first contract document;
feed the first clause into the specificity model;
automatically determine, via the specificity model, that the first clause falls under a first risk category of the set of risk categories;
extract, from the first contract document, a penalty clause associated with the first risk category;
cause a computing device to present a message identifying the first risk category for the first clause as well as information about the penalty clause;
receive feedback via the computing device regarding an accuracy of the first risk category classification of the first clause; and
automatically retrain the specificity model based on the received feedback.

17. The non-transitory computer-readable medium storing software of claim 16, wherein the instructions further cause the one or more computers to:
receive a second contract document with a first service level agreement (SLA) section;
extract a first service level parameter from the first SLA section;
feed the first service level parameter into a stringent SLA model configured to identify a risk level of the first service level parameter based at least in part on Project Categorization (PCAT) framework standards, the risk level referring to a probability of the first SLA section being classified under one of three risk classifications including a high risk classification, a moderate risk classification, and a low risk classification;
assign, to the first SLA section, a first risk classification corresponding to one of the three risk classifications; and
present, at the computing device, the assigned first risk classification for the first SLA section.

18. The non-transitory computer-readable medium storing software of claim 16, wherein the instructions further cause the one or more computers to perform a recurring scheduled alerts scan to identify upcoming delivery due dates in the first contract document.

19. The non-transitory computer-readable medium storing software of claim 18, wherein the instructions further cause the one or more computers to automatically determine if the due dates are linked to one or more penalty types, the penalty types including delivery-phase based penalties, SLA-based penalties, implementation-based penalties, and security breach penalties.

20. The non-transitory computer-readable medium storing software of claim 19, wherein the instructions further cause the one or more computers to automatically generate an alert identifying an upcoming delivery due date associated with the first contract and the penalty type linked to the upcoming delivery due date.

* * * * *